(12) United States Patent
Bottomley et al.

(10) Patent No.: US 8,126,043 B2
(45) Date of Patent: Feb. 28, 2012

(54) METHOD AND APPARATUS FOR BLOCK-BASED SIGNAL DEMODULATION

(75) Inventors: Gregory E. Bottomley, Cary, NC (US); Yi-Pin Eric Wang, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 956 days.

(21) Appl. No.: 12/035,846

(22) Filed: Feb. 22, 2008

(65) Prior Publication Data

US 2009/0213907 A1     Aug. 27, 2009

(51) Int. Cl.
*H03H 7/30* (2006.01)
*H03K 5/159* (2006.01)
(52) U.S. Cl. .................. 375/229; 375/316
(58) Field of Classification Search .......... 375/229–233, 375/316
See application file for complete search history.

(56) References Cited

U.S. PATENT DOCUMENTS

| | | | |
|---|---|---|---|
| 6,597,745 B1 * | 7/2003 | Dowling | 375/296 |
| 6,925,127 B1 | 8/2005 | Dent | |
| 6,963,532 B1 | 11/2005 | Dent | |
| 7,266,146 B2 * | 9/2007 | Pare et al. | 375/232 |
| 7,277,515 B2 * | 10/2007 | Yen | 375/350 |
| 2005/0201447 A1 | 9/2005 | Cairns et al. | |
| 2005/0201478 A1 | 9/2005 | Claussen et al. | |
| 2009/0296802 A1 * | 12/2009 | Ermolayev et al. | 375/233 |

FOREIGN PATENT DOCUMENTS

| | | |
|---|---|---|
| EP | 1331777 A1 | 7/2003 |
| EP | 1605600 A1 | 12/2005 |
| WO | 02/080480 A1 | 10/2002 |
| WO | 2005/096517 A1 | 10/2005 |

OTHER PUBLICATIONS

Gu et al., Adaptive Decision Feedback Equalization with MLSE Based on Predicted signals, IEEE International Conference on Communications '93, May 23, 1993, pp. 438-442.*
Balakrishnan, J. et al. "Time-Reversal Diversity in Decision Feedback Equalization." Proc. Allerton Conf. on Communication, Control and Computing. Monticello, IL, USA, Oct. 2000.
Co-pending U.S. Appl. No. 11/566,756, filed Dec. 5, 2006.
Co-pending U.S. Appl. No. 11/935,840, filed Nov. 6, 2007.

(Continued)

*Primary Examiner* — Chieh M. Fan
*Assistant Examiner* — Freshteh N Aghdam
(74) *Attorney, Agent, or Firm* — Coats & Bennett, P.L.L.C.

(57) ABSTRACT

Teachings presented herein combine the relative simplicity of equalization with the performance of maximum likelihood (ML) processing. These teachings are applied to the detection of symbols in a stream of symbol blocks. In one or more embodiments, block-based equalization, including feedforward filtering, suppresses inter-block interference and produces detection statistics for the symbols in each symbol block, and joint detection addresses intra-block interference by jointly detecting the most likely combination of symbols within each symbol block, based on the corresponding detection statistics. The joint detection obviates the need to address intra-block interference within the equalization filters, while, at the same time, the block-based equalization produces detection statistics for each symbol block thereby simplifying the joint detection process. Overall complexity is less than would be needed for full MLSE processing of the symbol blocks without equalization preprocessing, while performance is close to or on par with full MLSE processing.

18 Claims, 11 Drawing Sheets

OTHER PUBLICATIONS

Choi, J. et al. "Receivers with Chip-Level Decision Feedback Equalizer for CDMA Downlink Channels." IEEE Transactions on Wireless Communications, vol. 3, No. 1, Jan. 2004, pp. 300-314.

Duel-Hallen, A. "Decorrelating Decision-Feedback Multiuser Detector for Synchronous Code-Division Multiple-Access Channel." IEEE Transactions on Communications, vol. 41, No. 2, Feb. 1993, pp. 285-290.

Grant, S. J. et al. "Generalized RAKE Receivers for MIMO Systems." 2003 IEEE 58th Vehicular Technology Conference, vol. 1, Oct. 6-9, 2003, pp. 424-428.

Klein, A. et al. "Zero Forcing and Minimum Mean-Square-Error Equalization for Multiuser Detection in Code-Division Multiple-Access Channels." IEEE Transactions on Vehicular Techonology, vol. 45, No. 2, May 1996, pp. 276-287.

Mailaender, L. "Linear MIMO Equalization for CDMA Downlink Signals with Code Reuse." IEEE Transactions on Wireless Communication, vol. 4, No. 5, Sep. 2005, pp. 2423-2434.

Nelson, J. K. et al. "BAD: Bidirectional Arbitrated Decision-Feedback Equalization." IEEE Transactions on Communications, vol. 53, No. 2, Feb. 2005, pp. 214-218.

Tang, X. et al. "Contradictory Block Arbitration for Bi-directional Decision Feedback Equalizers." Proc. IEEE Globecom, Nov. 17-21, 2002, pp. 283-286.

Varanasi, M. K. "Parallel Group Detection for Synchronous CDMA Communication Over Frequency-Selective Rayleigh Fading Channels." IEEE Transactions on Information Theory, vol. 42, No. 1, Jan. 1996, pp. 116-128.

Xie, Z. et al. "A Family of Suboptimum Detectors for Coherent Multiuser Communications." IEEE Journal on Selected Areas in Communications, vol. 8, No. 4, May 1990, pp. 683-690.

Williamson, D. et al. "Block Decision Feedback Equalization." IEEE Transactions on Communications, vol. 40, No. 2, Feb. 1992, pp. 255-264.

Bottomley, G. et al. "A Generalized RAKE Receiver for Interference Suppression." IEEE Journal on Selected Areas in Communications, vol. 18, No. 8, Aug. 2000, pp. 1536-1545.

Wang, Y.P. E. et al. "DS-CDMA Downlink System Capacity Enhancement through Interference Suppression." IEEE Transactions on Wireless Communications, vol. 5, No. 7, Jul. 2006, pp. 1767-1774.

Oh, H.-S. et al. "Bidirectional Equalizer Arbitrated by Viterbi Decoder Path Metrics." IEEE Transactions on Consumer Electronics, vol. 53, Iss. 1, Feb. 2007, pp. 60-64.

Hochwald, B. M. et al. "Achieving Near-Capacity on a Multiple-Antenna Channel." IEEE Transactions on Communications, vol. 51, No. 3, Mar. 2003, pp. 389-399.

Eyuboglu, M. V. et al. "Reduced-State Sequence Estimation with Set Partitioning and Decision Feedback." IEEE Transactions on Communications, vol. 36, No. 1, Jan. 1988, pp. 13-20.

Bengough, P. A. et al. "Sorting-Based VLSI Architectures for the M-algorithm and T-algorithm Trellis Decoders." IEEE Transactions on Communications, vol. 43, No. 2/3/4, Feb./Mar./Apr. 1995, pp. 514-522.

Bottomley, "Block Equalization and Generalized MLSE Arbitration for the HSPA WCDMA Uplink," Vehicular Technology Conference, Sep. 21, 2008, pp. 1-5, IEEE, Piscataway, NJ, US.

Hafeez et al., "Adaptive Joint Detection of Cochannel Signals for TDMA Handsets," IEEE Transactions on Communications, Oct. 2004, pp. 1722-1732, vol. 52, No. 10, IEEE, Piscataway, NJ, US.

Smee et al., "Adaptive Space-Time Feedforward/Feedback Detection for High Data Rate CDMA in Frequency-Selective Fading," IEEE Transactions on Communications, Feb. 2001, pp. 317-328, vol. 49, No. 2, IEEE, Piscataway, NJ, US.

Smee et al., "Design Issues in Decision Feedback MMSE Multiuser Receivers for High Data Rate Indoor Wireless CDMA Networks," IEEE 6th International Conference on Universal Personal Communications Record, Oct. 12, 1997, pp. 5-9, IEEE, New York, NY, US.

Gu et al., "Adaptive Decision Feedback Equalization with MLSE Based on Predicted Signals," IEEE International Conference on Communications, Geneva, Switzerland, May 23-26, 1993, pp. 438-442, vol. 1, IEEE, New York, NY, US.

Lee et al., "A Maximum-Likelihood Sequence Estimator with Decision-Feedback Equalization," IEEE Transactions on Communications, Sep. 1977, pp. 971-979, vol. 25, No. 9, IEEE, Piscataway, NJ, US.

Ghaffar, R. et al. "Interference Suppression for Next Generation Wireless Systems." IEEE 69th Vehicular Technology Conference, 2009 (VTC Spring 2009), Apr. 26-29, 2009, Barcelona, Spain, pp. 1-5.

Aghdam, Freshteh N., Final Office Action dated May 4, 2011 for U.S. Appl. No. 12/035,932, filed Feb. 22, 2008.

* cited by examiner

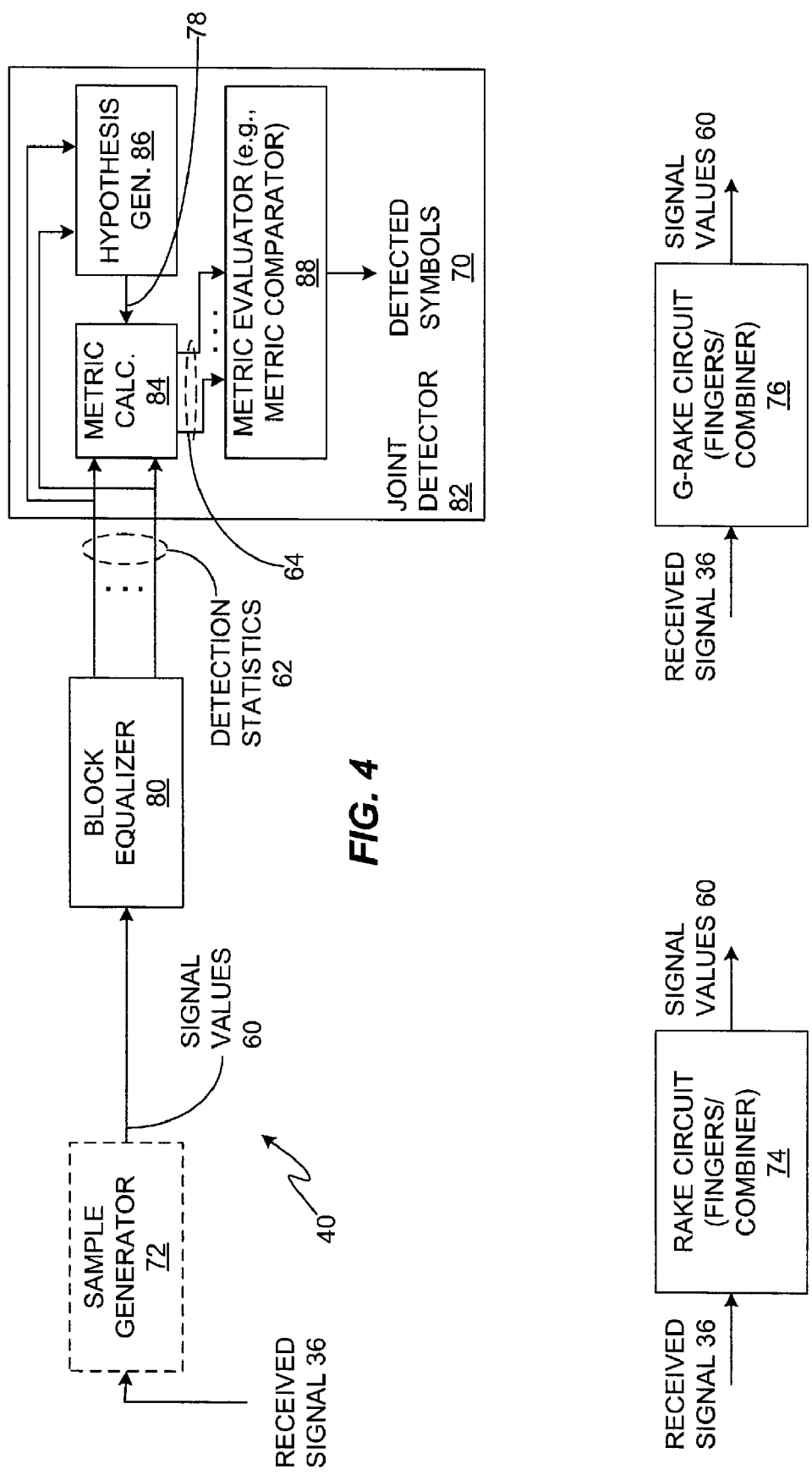

METHOD AND APPARATUS FOR BLOCK-BASED SIGNAL DEMODULATION

TECHNICAL FIELD

The present invention generally relates to communication signal processing, and particularly relates to block-based demodulation processing, such as may be used to process a received Code Division Multiple Access (CDMA) signal.

BACKGROUND

In Direct Sequence Code Division Multiple Access (DS-CDMA) systems, such as High Speed Packet Access (HSPA) services in Wideband CDMA (WCDMA) and similar packet services in 1 XEV-DO, different symbols are transmitted together through a mixture of code-division multiplexing (CDM) and time-division multiplexing (TDM). For example, downlink transmissions use orthogonal spreading codes to send a block of symbols for one or more users at a time. Symbol blocks are sent sequentially in orthogonal symbol periods. Uplink transmissions from the terminals to the network use a similar approach, sometimes referred to as multi-code transmission, to send blocks of symbols for one user. Sometimes, as in the case of HSPA, symbol blocks use a mixture of different spreading factors, while still maintaining orthogonal transmission.

In non-dispersive environments, orthogonality between symbols within a block and between different symbol-period blocks can be preserved through accurate synchronization and filtering. However, transmission channels in wireless communication networks are often dispersive, which destroys orthogonality. The loss of orthogonality between codes creates intersymbol interference (ISI), both between time-successive symbol blocks and between the symbols within each symbol block. In other words, with dispersive transmission channels, a symbol within any given symbol block in a time-wise stream of symbol blocks suffers interference arising from other symbols in the same block, and interference arising from other symbol blocks.

As transmission data rates become higher, such as in HSPA, processing gain is not sufficient to compensate for ISI. For example, for peak uplink rates of 11 Mbps or greater, there is a gap in performance between linear equalization and the matched filter bound. That gap indicates that meaningful receiver performance gains could be realized with more advanced forms of interference suppression. Of course, the challenges associated with implementing advanced interference suppression involve a range of design and operational tradeoffs between performance and complexity.

Several known solutions address ISI through some form of equalization. A first known approach is referred to as linear equalization (LE), wherein linear filtering (addition and multiplication operations) is applied to the received signal, to suppress ISI for recovery of each symbol of interest. Conventional LE filtering uses filter coefficients calculated to suppress inter-block interference (interference between sequential symbol blocks), as well as intra-block interference (interference between symbols within a block). This known approach generally is paired with simple, single-symbol detection that is applied to LE filter outputs, for recovery of individual symbols within each block. Such an approach trades symbol energy for ISI reduction.

Another known solution, known as decision feedback equalization (DFE), applies a combination of linear filtering and interference subtraction to the received signal, to recover each symbol of interest. With DFE, a subtractive process suppresses inter-block interference from previously detected blocks, while linear filtering suppresses inter-block interference from future, undetected blocks. Intra-block interference between the symbols within one block is handled as either part of the linear filtering or through a combination of linear filtering and sequential detection and subtraction (decorrelating decision feedback equalizer or DDFE). Like linear equalization, this approach trades signal energy for ISI reduction, but potentially less symbol energy is traded, as the linear filter does not necessarily need to suppress past inter-block interference. As with linear equalization, simple single-symbol detection generally is used to detect the individual symbols in each symbol block being processed. An exception is the block DFE described in Williamson et al., "Block Decision Feedback Equalization," IEEE Transactions on Communications, February 1992, where joint detection is applied to blocks of symbols. However, there is no feedforward filtering, so that only partial signal energy is used in detecting symbols.

Another known approach improves over LE and DFE because it does not trade symbol energy for ISI reduction. Such an approach, using maximum likelihood sequence estimation (MLSE) or Maximum A Posteriori (MAP) symbol detection, forms and accumulates metrics which are then used for jointly detecting sequences of symbols. Such detection addresses both inter-block and intra-block interference, but it comes at the expense of significantly more complex processing because of the need to hypothesize many symbol combinations, and to maintain correspondingly complex state spaces and accumulation metrics.

SUMMARY

Teachings presented herein combine the relative simplicity of equalization with the performance of maximum likelihood (ML) processing for communication signal demodulation. Particularly, these teachings are applied to the block-based detection of symbols in a stream of symbols, such as may be received on one or more spreading codes of a Code Division Multiple Access (CDMA) signal.

In one or more embodiments, block-based equalization (linear equalization or decision feedback equalization) suppresses inter-block interference and produces detection statistics for the symbols in a symbol block, and joint detection addresses intra-block interference by jointly detecting the most likely combination of symbols within the symbol block, based on the corresponding detection statistics. One or more embodiments of this method include obtaining signal values from the received signal for at least one symbol block, and generating detection statistics for the symbols in a symbol block by performing block-based feedforward filtering of the signal values obtained for the symbol block. Processing according to the method further includes jointly detecting the symbols in a symbol block by generating joint metrics from the detection statistics generated for the symbol block and comparing the joint metrics.

The use of joint detection obviates the need to address intra-block interference within the filters used for block-based equalization to produce detection statistics for each symbol block simplifies the joint detection process. Overall complexity is less than would be needed for full MLSE processing of the symbol blocks without equalization preprocessing, while performance is close to or on par with full MLSE processing.

At least one embodiment uses block-based linear equalization, wherein the filter coefficients of a feedforward filter account for inter-block interference arising from preceding and succeeding symbol blocks, while at least one other embodiment uses block-based decision feedback equalization to account for such interference. In both cases, joint detection addresses intra-block interference.

In one embodiment employing decision feedback equalization, a feedforward filter is configured to account for inter-block interference arising in a current symbol block from a succeeding symbol block, and a feedback filter is configured to account for inter-block interference arising in the current symbol block from a preceding symbol block. In another embodiment, the feedforward filter accounts for partial removal of preceding symbol block interference, and subtractive cancellation using feedback filter values employs full or partial subtraction of preceding symbol block interference.

Still further, various embodiments of the above processing use code-specific processing, wherein code-specific correlation information is used for filter coefficient generation. Other embodiments use code-averaged correlation information. Still further, at least some embodiments use forward and backward or other iterative processing, so that symbol detection results from two or more iterations can be combined or otherwise compared, for improved joint detection.

However, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a block diagram of one embodiment of a receiver circuit for block-based received signal processing.

FIG. 5 is a block diagram of one embodiment of a Rake receiver circuit for generating signal values for block-based received signal processing.

FIG. 6 is a block diagram of one embodiment of a Generalized Rake (G-Rake) receiver circuit for generating signal values for block-based received signal processing.

DETAILED DESCRIPTION

Figure 1:
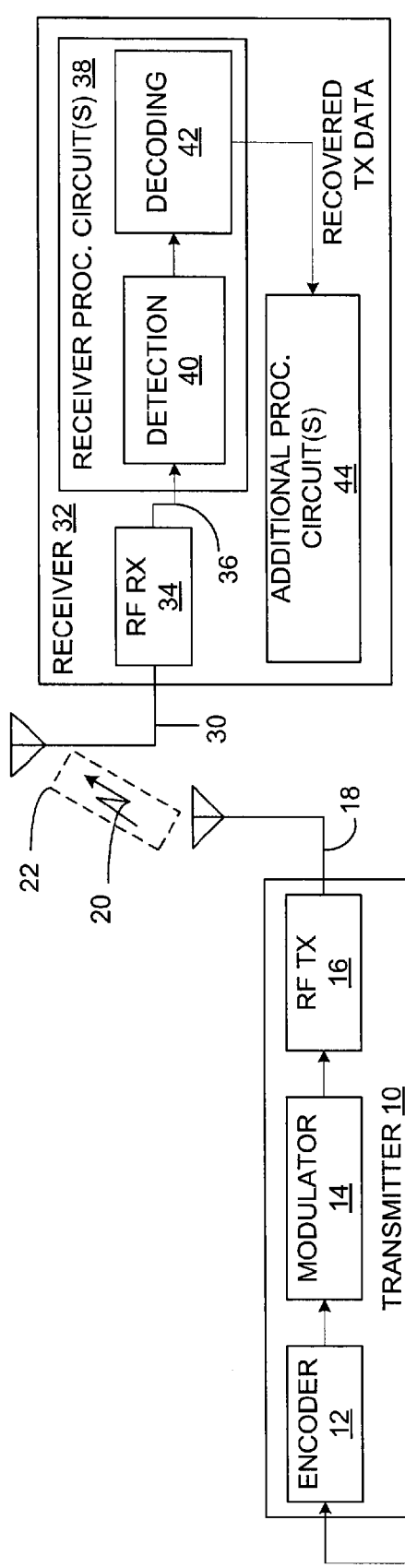
FIG. 1 is a block diagram of one embodiment of a transmitter and receiver system, wherein the receiver implements block-based received signal processing according to the teachings presented herein.

FIG. 1 illustrates an example system diagram, including a transmitter 10, where information symbols are optionally encoded using a forward-error-correction (FEC) encoder 12. In one example, the FEC encoder 12 comprises a convolutional encoder or turbo-code encoder. The resulting modem bits from the encoder 12 serve as inputs to a modulator 14, which forms modem symbols (e.g. QPSK, 16-QAM, or 64-QAM) that in turn are used to modulate spreading waveforms. These spreading waveforms are then modulated onto a radio carrier in an RF transmission circuit 16 and transmitted on one or more transmit antennas 18.

The transmitted signal 20, which may be a CDMA signal including multiple signals of interest channelized on different spreading codes, passes through a transmission medium 22, such as a multipath fading channel, and arrives at one or more receive antennas 30 at a receiver 32. The antenna-received signals, which may be composite signals including numerous multipath components, are processed by a front-end RF receiver circuit 34, which mixes the signals down to baseband and produces corresponding digitized samples. The resultant baseband signal 36, representing one or more receive antennas, is provided to receiver processing circuits 38, which recover hard or soft information corresponding to the received modem bits or modem symbols.

Of particular interest regarding the teachings herein, the receiver processing circuits 38 include a detection circuit 40 that is configured to perform block-based received signal processing. In particular, the detection circuit 40 is configured to perform equalization on the signal values representing symbol blocks of interest in a stream of symbol blocks conveyed in the received signal 36. In at least one embodiment, signal values for at least one symbol block are obtained from the received signal, and the detection circuit 40 is configured generate detection statistics for the symbols in a symbol block by performing block-based feedforward filtering of the signal values obtained for the symbol block. The detection circuit 40 is further configured to jointly detect the symbols in a symbol block by generating joint metrics from the detection statistics generated for the symbol block and comparing the joint metrics.

Block-based equalization produces detection statistics for each such symbol block, e.g., a detection value for each bit in each symbol in the symbol block, and the detection circuit 40 is further configured to process those detection statistics using a maximum-likelihood (ML) joint detection algorithm to obtain detected bit values for each bit in each such symbol block. The detected bit values are, in at least one embodiment contemplated herein, soft values formed, for example, by differences in joint detection metrics or other standard approaches. The detected bit values are passed along, for example, to a decoding circuit 42, which decodes them and thereby recovers the originally transmitted information. The recovered information may, for example, be provided to additional processing circuits 44 for use therein, such as for processing for presentation to a device user.

Figure 2:
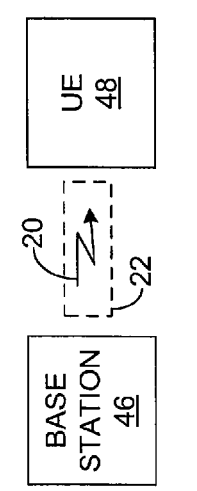
FIG. 2 is a block diagram of a receiver implemented as a wireless communication terminal, adapted to receive a communication signal from a supporting wireless communication network base station.

With momentary reference to FIG. 2, those skilled in the art will appreciate that the receiver processing circuits 38, including the detection circuit 40, may be implemented in a wireless communication network base station 46 as applied to uplink signal processing and/or in user equipment (UE) 48, as applied to downlink signal processing. By way of non-limiting example, the base station 46 includes an embodiment of the detection circuit 40 and is implemented as a Wideband CDMA base station. Additionally, or alternatively, the UE 48 includes an embodiment of the detection circuit 40 and is configured as a Wideband CDMA mobile terminal, such as a cellular radiotelephone, wireless pager, wireless network interface card, computer, PDA, or other wireless communication device.

Referring again to FIG. 1, those skilled in the art will further appreciate that the receiver processing circuits 38 comprise one or more processing circuits that can be implemented in hardware, software, or any combination thereof. In particular, the detection circuit 40 may be implemented in hardware, software, or any combination thereof. In one embodiment, the detection circuit 40 is implemented at least partially in a digital signal processor (DSP) or other microprocessor-based circuit executing computer program instructions stored in a memory device included in or associated with the detection circuit 40. In another embodiment, at least a portion of the detection circuit 40 is implemented in hardware, such as may be implemented in digital processing elements within an Application Specific Integrated Circuit (ASIC).

Figure 3:
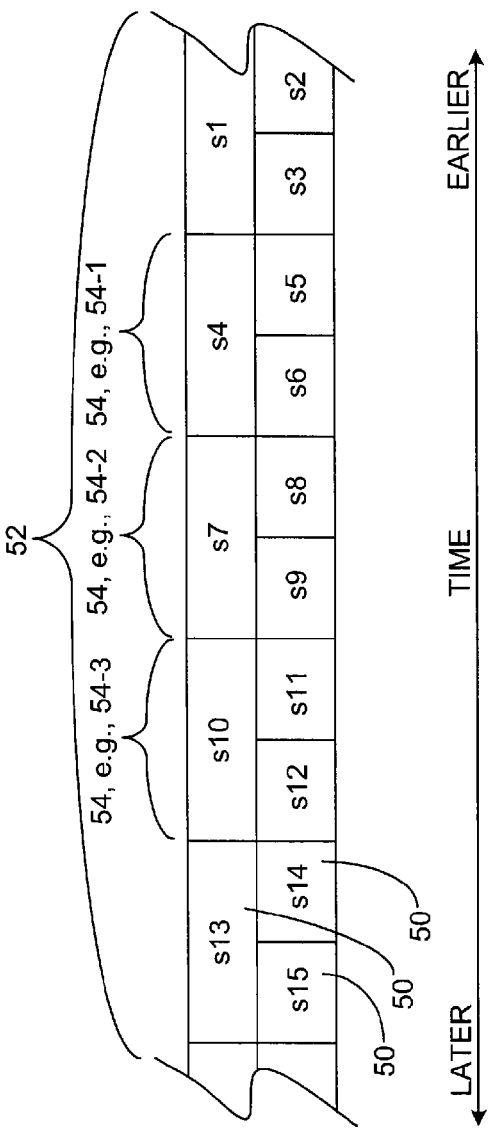
FIG. 3 is a diagram of one example of a stream of symbol blocks, each including two or more symbols, as contemplated for block-based received signal processing.

With the above implementation flexibility in mind, and with additional reference to FIG. 3, FIG. 1 should be understood as an example depiction of a communication receiver circuit—e.g., the detection circuit 40—that is configured to recover symbols 50 from a received signal 36 logically conveying a stream 52 of symbol blocks 54, each symbol block 54 comprising two or more symbols 50. It should be understood that each symbol block 54 generally contains different symbol information, and, likewise, each symbol 50 generally differs from the other symbols 50 within the same symbol block 54.

It also should be understood that the receiver 32 shown in FIG. 1 buffers all or part of the received signal 36 or derived values, such that information representing the stream 52 of symbol blocks 54 is available for processing according to the teachings presented herein. For example, the receiver 32 is configured to maintain a running buffer of a desired depth for buffering the received signal 36, or corresponding derived values. In this time-wise sense, any given symbol block 54 may be considered a "current" symbol block 54 for processing, with earlier-received symbol blocks 54 being considered "preceding," "prior," or "previous" symbol blocks 54 and later-received symbol blocks being considered "succeeding," or "later," symbol blocks 54.

As shown in FIG. 3, for any given symbol block 54 of interest, there generally are one or more preceding symbol blocks 54 and one or more succeeding symbol blocks 54. More particularly, as an example, the symbol block "54-1" is a preceding symbol block relative to symbol block 54-2, and symbol block 54-3 is a succeeding symbol block relative to symbol block 54-2. This use of "-1," "-2," "-3," designators, or other like designators generically represents any given group of preceding, current, and succeeding symbol blocks 54 within the stream 52. In the illustrated example, detection of the symbols 50 in symbol block 54-2 (denoted as s7, s8, and s9) is complicated by intra-block interference between s7, s8, and s9, and by the symbols s4-s6 and s10-s12 in symbol blocks 54-1 and 54-3, respectively.

In this context, and with reference to FIG. 4 as a non-limiting example, the detection circuit 40 comprises one or more processing circuits configured to obtain signal values 60 from the received signal 36 for each symbol block 54 to be detected, generate detection statistics 62 for the symbols 50 in each such symbol block 54 by performing block-based equalization of the corresponding signal values 60, and jointly detect the symbols 50 in each such symbol block 54 by generating joint metrics 64 from the corresponding detection statistics 62 and comparing the joint metrics 64. Such processing results in the output of detected symbols 70, for decoding, etc.

The signal values 60 may be the digitized sample values of the received signal 36, or may be signal samples derived from the received signal 36. In one example, the signal values 60 comprise chip-rate or sub-chip-rate samples corresponding to the composite antenna-received signal(s) 20. In another embodiment, the detection circuit 40 includes preprocessing circuits 72, shown as a sample generator 72 in FIG. 4, to derive the signals values 60 from the received signal 36. For example, FIG. 5 shows that that the sample generator 72 may comprise a Rake receiver circuit 74, which combines despread values for the spreading codes of interest, e.g., the spreading codes associated with the symbols 50 embedded in the symbol stream 52. In such embodiments, the signal values 60 comprise the despread values obtained by correlation processing implemented in the path-aligned Rake fingers of the Rake receiver circuit 74. In another embodiment, the signal values 60 comprise the corresponding Rake-combined values produced by a combining circuit within the Rake receiver circuit 74. In other embodiments, the signal values 60 comprise Rake-combined chip samples, despread values prior to Rake combining, or sliding Rake-combined values corresponding to a particular spreading code.

Similarly, as shown in FIG. 6, the preprocessing circuits 72 may comprise a Generalized Rake (G-Rake) receiver circuit 76. In such cases, the signal values 60 may comprise G-Rake combined despread values or chip values. As those skilled in the art will appreciate, G-Rake processing distinguishes from Rake processing in that the combining weights used to combine the despread values or chip samples account for the correlation of signal impairment across time and receive antennas, thereby providing interference whitening.

Returning to FIG. 4, one sees that the detection circuit 40 is configured to jointly detect the symbols 50 in each symbol block 54 of interest by using the detection statistics 64 generated for each symbol block 54 to compute joint metrics 64 corresponding to hypotheses for a group of symbols representing different combinations of possible symbol values. That is, each hypothesis represents a different combination of possible symbol values for the group. The joint metrics 64 are compared to identify the most likely symbol block value—i.e., the most likely combination of possible symbol values—for the symbol block 54 of interest. In more detail, processing each symbol block 54 produces corresponding detection statistics 62, which may comprise a detection value—e.g., a soft bit value for each bit of each symbol 50 included in the symbol block 54. In turn, in joint detection processing for each symbol block 54 of interest, the detection statistics 62 are used to compute a number of joint metrics 64, corresponding to a number of hypotheses for the group of symbols 50 comprising the symbol block 54. These hypotheses are referred to as block hypotheses 78. Each symbol block hypothesis in the set of symbol block hypotheses 78 represents a different combination of possible symbol values. Such processing includes comparing the joint metrics 64 to identify a most likely one of the symbol block hypotheses 78.

Supporting such processing, one or more embodiments of the detection circuit 40 comprise a block equalizer 80 and a joint detector 82. The block equalizer 80 performs block-based equalization of the signal values for a symbol block 54 in the stream 52 of symbol blocks 54. More particularly, the block equalizer 80 produces a set of detection statistics 62 from the signal values 60 of at least one symbol block 54. In at least one embodiment, the detection statistics 62 produced for each symbol block 54 of interest comprise a detection value for each symbol 50 to be detected within the symbol block 54. (For example, with three separate symbols 50 in each symbol block 54, the detection statistics 62 comprise a set of three detection values for each symbol block 54. Also, it should be noted that such detection statistics 62 may comprise soft values for each bit in each symbol 50 within the symbol block 54.)

For each symbol block 54 being processed, the corresponding detection statistics 64 are input to a metric calculator 84, which produces the joint metrics 64 for each symbol block 54 based on the corresponding detection statistics 62 and the symbol block hypotheses 78 representing different possible combinations of values defined for the symbols 50 being detected—i.e., combinations of possible symbol values from a defined constellation or set of possible symbol values. As will be detailed later herein, a hypothesis generator 86 may be configured to generate the symbol block hypotheses 78 in view of the detection statistics 62, such that considerably fewer than all possible combinations of symbol values are hypothesized. In any case, a metric evaluator 88 evaluates the joint metrics 64 generated for a given symbol block 54, e.g., by comparing them, and selects the most likely combination of possible symbol values.

Figure 7:
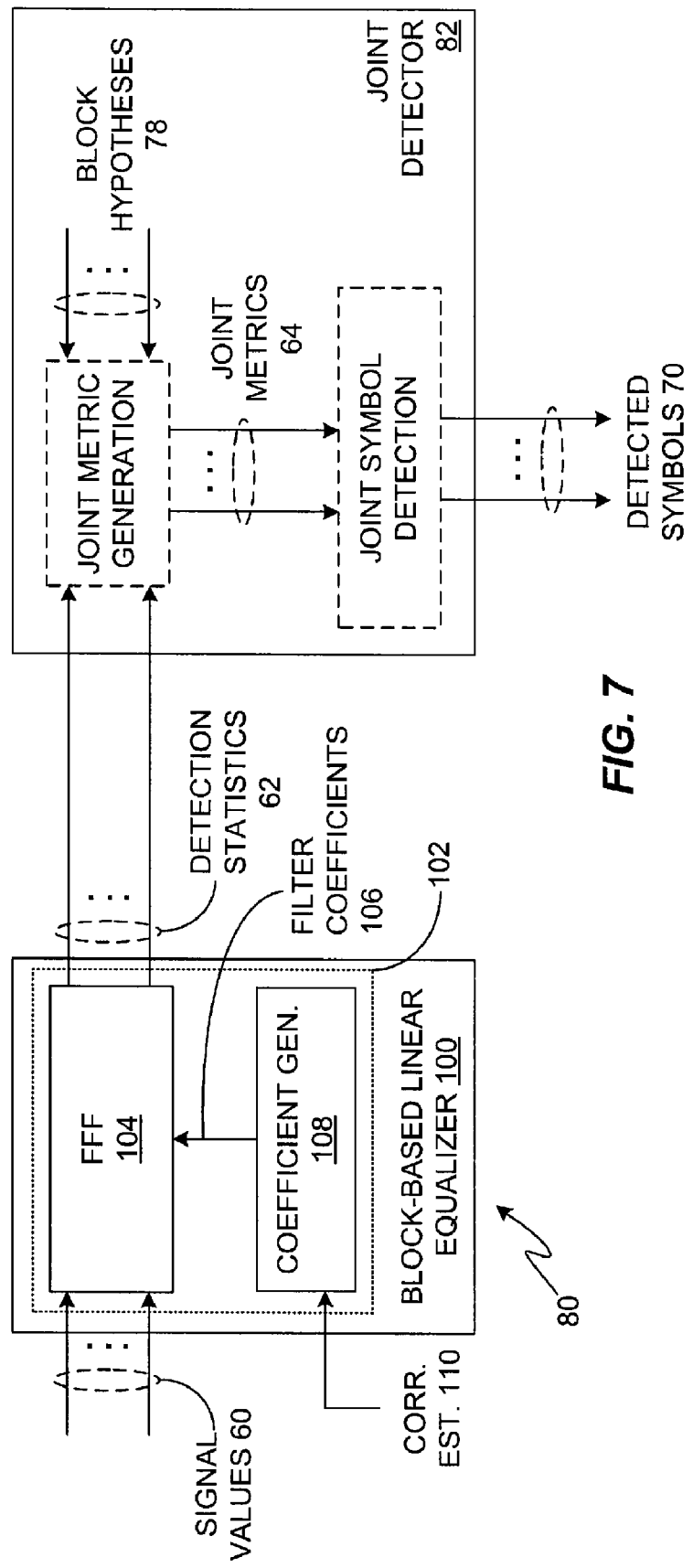
FIG. 7 is a block diagram of one embodiment of a receiver circuit for block-based received signal processing, including block-based linear equalization processing in combination with joint symbol detection.

As shown in FIG. 7, in at least one embodiment, the block equalizer 80 comprises a block-based linear equalization circuit 100 comprising a feedforward filter circuit 102 that produces the detection statistics 62 for each symbol block as a set of filtered values by passing the signal values 60 for each symbol block 54 through a feedforward filter 104, whose filter coefficients 106 account for inter-block interference arising from preceding and succeeding symbol blocks 54. To that end, the feedforward filter circuit 102 includes, in one or more embodiments, a filter coefficient generator 108, that generates the filter coefficients 106 as a function of correlation estimates 110 that account for inter-block interference in given symbol blocks 54 arising from preceding and succeeding symbol blocks 54. Notably, because joint detection accounts for intra-block interference, the coefficient generator 108 can better suppress other-block interference by eliminating the need to account for intra-block interference in filter coefficient generation. (In some embodiments, the coefficient generator 108 includes a processor or other calculation circuit for generating the correlation estimates 110, while in other embodiments another processor within the receiver 38 generates those estimates).

Figure 8:
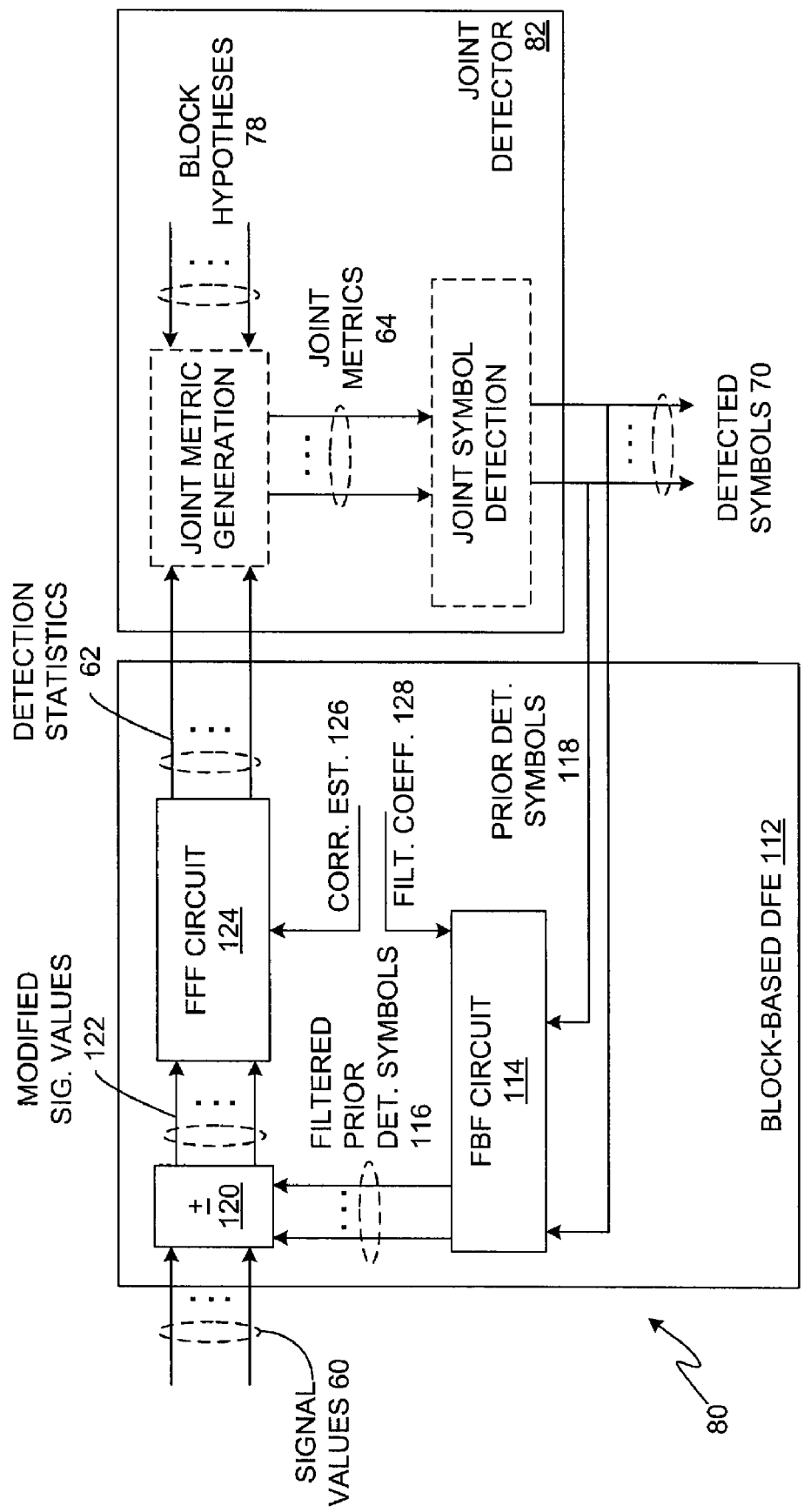
FIG. 8 is a block diagram of one embodiment of a receiver circuit for block-based received signal processing, including block-based decision feedback equalization processing in combination with joint symbol detection.

As an alternative, FIG. 8 illustrates that in at least one other embodiment the block equalizer 80 comprises a block-based decision feedback equalizer circuit 112. In such embodiments, a feedback filter (FBF) circuit 114 outputs filtered previously detected symbol values 116, which it obtains by passing previously detected symbol values 118 through a feedback filter included in the feedback filter circuit 114. The previously detected symbol values 116 comprise, with respect to the signal values 60 of a current symbol block 54 being operated on by the block decision feedback equalizer 112, hard or soft values generated by the joint detector 82 for one or more previously detected symbol blocks 54.

The filtered previously detected symbol values 116 are subtracted from the signal values 60 of the current block in a combining circuit 120, and the resultant modified signal values 122 are input to a feedforward filter circuit 124. To the extent that subtraction of the filtered previously detected symbol values 116 accounts for preceding symbol block interference in the signal values 60 of the current symbol block 54, the filter coefficients used by the feedforward filter circuit 124 may account only for succeeding symbol block interference and possibly the residual interference from preceding blocks. Thus, in one embodiment, correlation estimates 126 for the feedforward filter circuit 124 are generated to account for inter-block interference arising from succeeding symbol blocks 54 with respect to any given current symbol block 54, and feedback filter coefficients 128 for the feedback filter circuit 114 are generated to account for inter-block interference arising from preceding symbol blocks 54.

Figure 9:
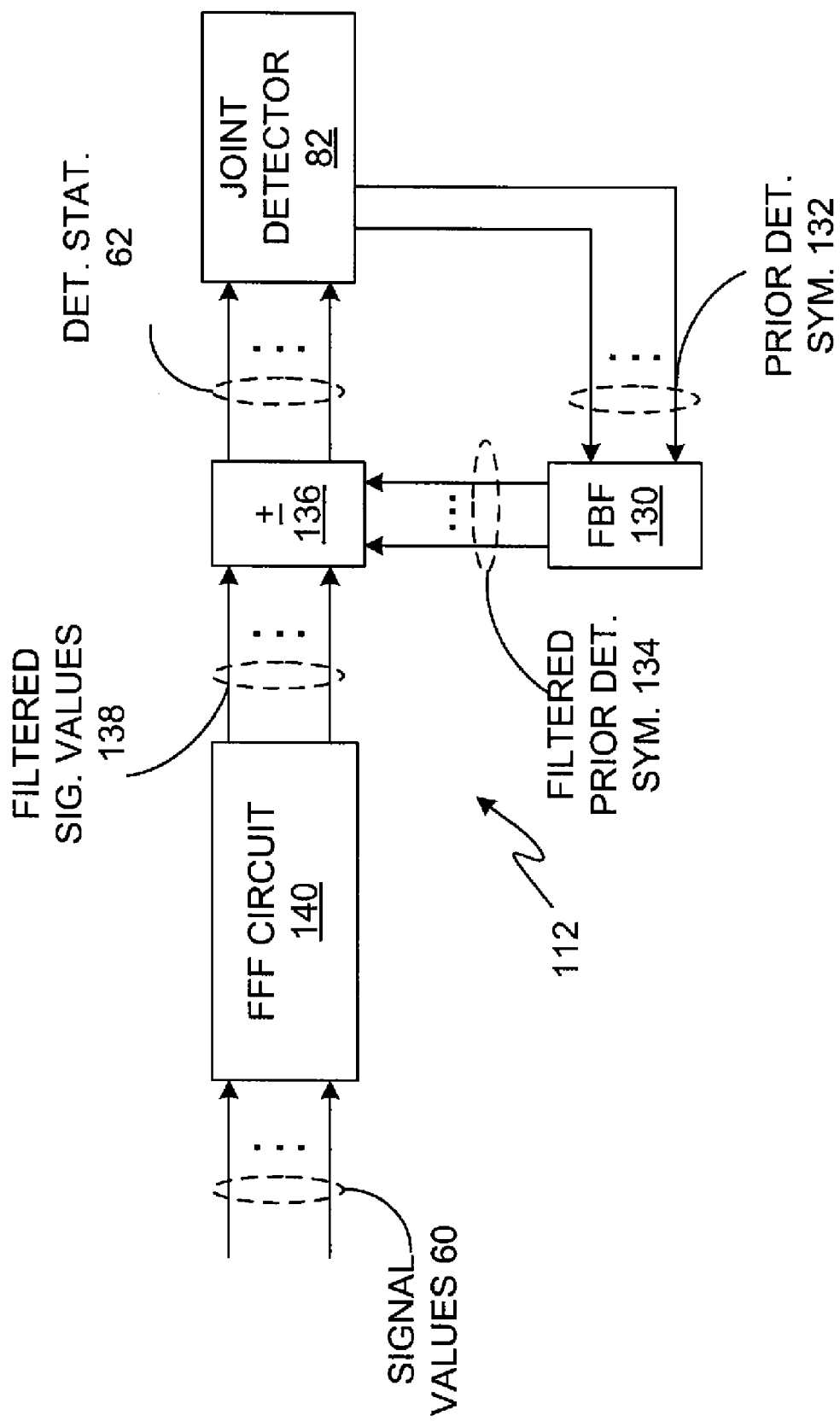
FIG. 9 is a block diagram of another embodiment of a receiver circuit for block-based received signal processing, including block-based decision feedback equalization processing in combination with joint symbol detection.

FIG. 9 illustrates an alternative embodiment for decision feedback equalization processing, wherein subtractive cancellation via feedback filtering is performed after feedforward filtering. Particularly, a feedback filter circuit 130 filters prior detected symbol values 132 to obtain filtered prior detected symbol values 134. The filtered prior detected symbol values 134 are provided to a combining circuit 136 for subtractive cancellation from filtered signal values 138. Correspondingly, a feedforward filter circuit 140 filters signal values 60 over a given window of time, such as a time window encompassing a plurality of symbol blocks 54 that are to be detected, to form the corresponding filtered signal values 138.

The combining circuit 136 thus subtracts or otherwise removes the filtered prior detected symbols 134 from the filtered signal values 138, to produce detection statistics 62 for each symbol block 54 of interest. The feedforward/feedback filter circuits depicted in FIG. 9 have different reference numbers than used in FIG. 8, for example, to denote that the filter coefficient generation may or may not differ, to account for the different processing order, but those skilled in the art will appreciate that the overall bock-based decision feedback equalization and joint detection processing are generally consistent with that presented in FIG. 8.

In any case, FIGS. 4, 7, 8, and 9 should be understood as advantageous but non-limiting examples of the detection circuit 40, wherein the detection circuit 40 receives as inputs chip samples or Rake-filtered chip samples or G-Rake filtered chip samples (chip-level block equalization) or despread or Rake-combined or G-Rake combined values (symbol-level block equalization). The block equalizer 80 that performs block equalization on the signal values 60 representing each symbol block 54 in a stream 52 of symbol blocks 54 includes filtering that processes filter inputs within a sliding window of time to produce multiple outputs, one for each symbol 50 within each symbol block 54 of interest. These per-block outputs represent per-block detection statistics 62 and are provided to the joint detector 82, for recovery of hard or soft symbol information 70 regarding the individual symbols 50 jointly detected for any given symbol block 54.

Broadly, then, in at least one aspect, the teachings presented herein provide a method of recovering symbols 50 from a received signal 36 conveying a stream 52 of symbol blocks 54, each symbol block 54 comprising two or more symbols 50. In one such embodiment, the method comprises obtaining signal values 60 from the received signal 36 for symbol blocks 54 of interest (which may be all or a subset of symbol blocks 54 in the stream 52), generating detection statistics 62 for the symbols 50 in a symbol block 54 by performing block-based equalization of the signal values 60, and jointly detecting the symbols 50 in the symbol block 54. In one or more embodiments, performing block-based equalization comprises performing block linear equalization on the signal values 60 of a symbol block 54 to suppress inter-block interference arising from succeeding and preceding symbol blocks 54. At least one such embodiment includes generating the detection statistics 62 as filtered signal values obtained by passing the signal values 60 for a symbol block 54 through a feedforward filter, e.g., filter 104 in FIG. 7. In one or more embodiments, feedforward filter coefficients are determined as a function of correlation estimates corresponding to inter-block interference in each symbol block 54 arising from the preceding and succeeding symbol blocks 54.

In one or more other embodiments, performing block-based equalization includes performing block decision feedback equalization for the signal values 60 in a symbol block 54 to suppress interference arising from succeeding and preceding symbol blocks 54. Performing block decision feedback equalization comprises in at least one such embodiment applying feedforward filtering to the signal values 60 for a symbol block 54 to suppress inter-block interference arising from one or more succeeding symbol blocks 54 and applying subtractive cancellation to the signal values 60 to suppress inter-block interference arising from one or more preceding symbol blocks 54. See, for example, the example processing depicted in FIG. 8.

In one or more such embodiments, applying feedforward filtering comprises accounting for partial removal of inter-block interference arising from the preceding symbol block 54 in the filtering coefficients 106 used for said feedforward filtering, and applying subtractive cancellation comprises fractionally or fully weighting cancellation values (i.e., the values 116) for subtractive cancellation. Partial removal can be the result of fractional weighting in the feedback filter and/or symbol errors in the symbol values provided to the feedback filter. Again, refer to FIG. 8, wherein the filter coefficients 128 or the values 116 may be scaled by a weighting factor. As such, feedforward filtering can be used to suppress inter-block interference arising from a succeeding symbol block 54 and to suppress inter-block interference arising from partial removal of a preceding symbol block 54, and subtractive cancellation can be used to suppress inter-block interference arising from a preceding symbol block 54 to a full or partial extent.

The use of the joint detector 82 for jointly detecting symbols 50 within individual symbol blocks 54 changes the designs of the filters used in the block equalizer 80. That is, in contrast to the conventional approach of designing equalization filtering to include suppression of intra-block interference as well as inter-block interference, the filters used in the block equalizer 80 need only account for inter-block interference. (With the joint detector 82 accounting for intra-block interference.) Advantageously, filtering within the block equalizer 80 thus can be configured to provide more signal energy collection than would be possible if intra-block interference suppression was implemented by those filters, thereby improving performance.

Figures 10, 11, 12:
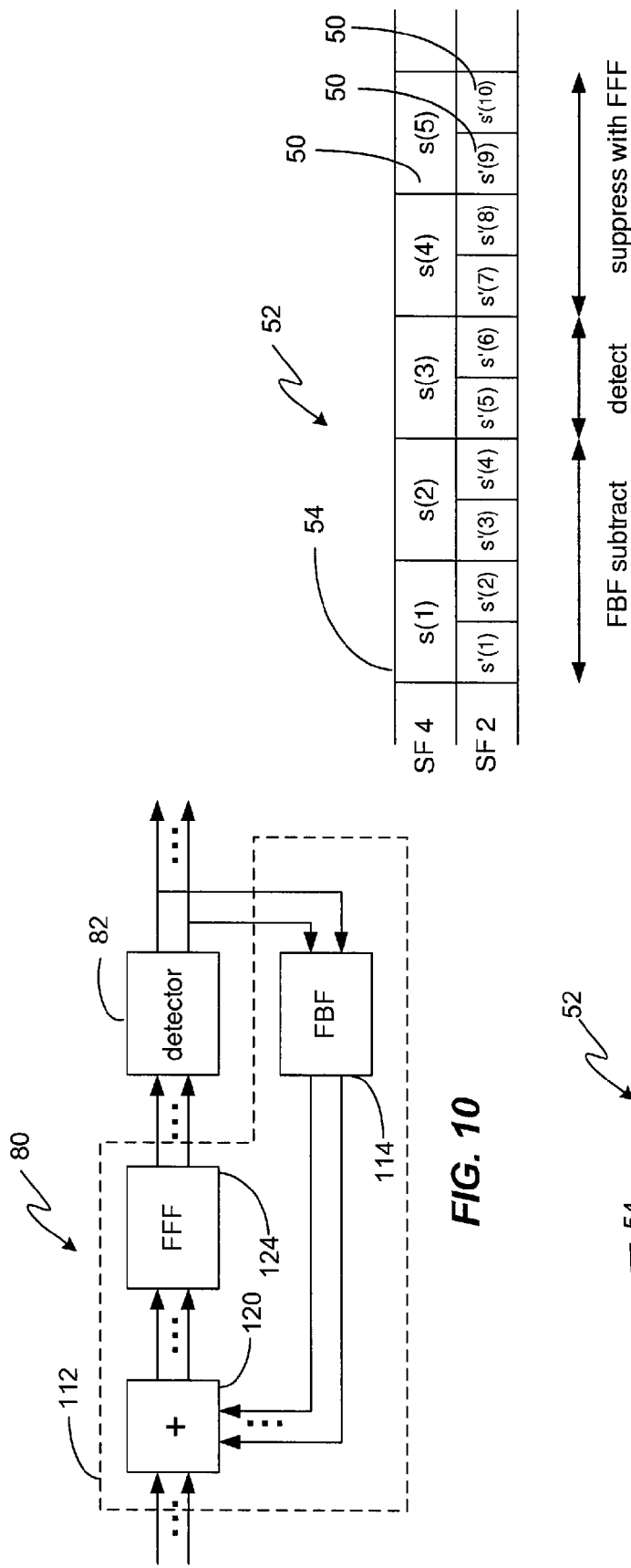
FIG. 10 is a block diagram of another embodiment of a receiver circuit for block-based received signal processing, including block-based decision feedback equalization processing in combination with joint symbol detection.
FIG. 11 is a diagram of another example of a stream of symbol blocks, each including two or more symbols, as contemplated for block-based received signal processing.
FIG. 12 is a diagram of another example of a stream of symbol blocks, each including two or more symbols, as contemplated for block-based received signal processing.

Referring to FIG. 10, which represents a somewhat simplified depiction of the functional circuit arrangement presented in FIG. 8, one sees that the design of the feedback filter circuit 114 can be simplified and decoupled from the design of the feedforward filter circuit 124 by placing the feedback-based subtractive cancellation process in advance of the feedforward filter circuit 124. That is, the combining circuit 120 provides the feedforward filter circuit 124 with modified signal values 122 in which inter-block interference from previously detected symbol blocks 54 is already suppressed.

In a related illustration, FIG. 11 provides a non-limiting example of how a stream 52 of symbol blocks 54 is structured in at least one embodiment. With the illustrated structure, two symbol streams are sent in parallel on two spreading codes. This arrangement yields two symbols 50 within each symbol block 54—e.g., $s(1)$ on one spreading code and $s'(1)$ on another spreading code. For the block-based decision feedback equalization with joint detection, such as is performed by the example circuit structure in FIG. 10, the symbols $s(3)$ and $s'(3)$ are detected jointly in the joint detector 82. Complementing that detection, the feedback filter 114 in the block equalizer 80 is used to remove interference from preceding (previously detected) symbol blocks 54, and the feedforward filter 124 is used to suppress interference from succeeding (future) symbol blocks 54, as well as noise. Note that the feedforward filter 124 operates on the entire window of data.

For the block-based linear equalization, such as first introduced in FIG. 7, the feedforward filter 104 of the illustrated feedforward filter circuit 102 would be configured to suppress interference from past as well as future symbol blocks 54. Also, note that FIG. 7, for clarity of discussion, illustrates the feedforward filter circuit 102 as containing a coefficient generator 108, in addition to the feedforward filter 104. Those skilled in the art will appreciate that any filter illustrated herein may have a similar arrangement, wherein an overall filtering function may be considered to include the memory positions for holding signal values and filter coefficients, along with the processing circuits used to compute those coefficients. Further, these architectural details should be understood as non-limiting examples, and other arrangements for implementing the illustrated filtering within a digital processing environment are contemplated herein.

In another example of a stream 52 of symbol blocks 54, FIG. 12 illustrates a case where each symbol block 54 includes three different symbols 50, with one of the symbols 50 formed using a first spreading factor (SF 4) and the remaining two symbols 50 formed using a second spreading factor (SF 2). Such circumstances arise, for example, in HSPA uplink, where certain data rates are achieved using a mixture of spreading factors. Specifically, one stream is sent with spreading factor 4 and another is sent with spreading factor 2.

For the block-based decision feedback equalization with joint detection, symbol blocks 54 can be defined for the two streams as containing one symbol of SF 4 and two symbols of spreading factor 2. The two symbols of SF 2 can be thought of as SF 4 with spreading sequences that have zeroes in them. However, while this arrangement may be convenient or otherwise advantageous, it should be understood that in general the symbol blocks 54 can be defined as any number of symbols 50, taken across spreading codes and across time. Indeed, the receiver 32 can, e.g., by way of configuring the detection circuit 40, be made to impose an essentially arbitrary symbol block definition on incoming streams of symbols. Of course, that and certain other aspects of the detection circuit 40 will depend on the intended application, the expected worst-case channel dispersion, and such considerations may, for example, affect filter design considerations, such as filter length.

In general, however, there are two main approaches to filter design for the block equalizer 80 of the detection circuit 40. In a first, code-specific approach, feedforward filtering used for block-based linear equalization and the feedforward filtering used for block-based decision feedback equalization are designed as a function of the spreading codes used by the desired and interfering symbols. In a second, code-averaged approach, these filters are designed by averaging out the effects of the interfering symbol codes and possibly the effects of the desired symbol codes, wherein the "desired symbols" are the symbols 50 within any given symbol block 54 to be decoded. A hybrid approach is also possible, where the effects of a subset of the interfering symbol codes are averaged out whereas the code-specific properties of another subset of the interfering symbol codes are utilized.

In at least one embodiment, the code-specific approach is based on a model in which terms depend on the spreading codes used. Specifically, the window of signal values 60 (chip samples, Rake-combined values) that are to be processed to extract a block 54 of symbols 50 is denoted with column vector z. This vector can be modeled as $$z = \sum_{k \in G_1} a_k h_k s_k + \sum_{k \in G_2} a_k h_k s_k + \sum_{k \in G_3} a_k h_k s_k + n \qquad \text{Eq. (1)}$$
$$= H_1 A_1 s_1 + H_2 A_2 s_2 + H_3 A_3 s_3 + n,$$

where $G_1$ is the group (set) of previously detected symbols 50 for one or more previous symbol blocks 54 to be removed by feedback filtering, e.g., to be removed by the feedback filter 114 in FIG. 10. For block-based linear equalization, such as shown in FIG. 7, there is no feedback filtering and $G_1$ is the empty set. $G_2$ is the group (set) of symbols 50 to be jointly detected in the symbol block 54 of interest, which is the "current" symbol block 54 being detected. $G_3$ is the group (set) of symbols 50 in one or more succeeding symbol blocks 54 (not yet detected) to be suppressed by feedforward filtering, e.g., by the feedforward filter 104 shown in FIG. 7 for block-based linear equalization, or by the feedforward filter circuit 124 shown in FIGS. 8 and 10. Further, $s_k$ is a modem symbol ($s_k$ is a vector of modem symbols 50 within a symbol block 54), $a_k$ is a symbol amplitude ($A_k$ is a diagonal matrix of symbol amplitudes), $h_k$ is a symbol response vector ($H_k$ is a matrix whose columns are symbol response vectors), indicating how symbol k contributes to vector z, and n is an impairment vector, accounting for thermal noise and other interfering symbols.

Note that the elements in $h_k$ depend on the spreading codes used as well as the transmission medium response and chip pulse shape. In practice, the spreading codes would be known or "virtual user" codes could be used. Medium response channel estimates can be obtained using known techniques. The elements in the A matrices are related to code powers. These can be estimated using known techniques, such as described in the co-pending and commonly assigned U.S. patent application filed on 5 Dec. 2007 and now identified by application Ser. No. 11/566,756, or in the co-pending and commonly assigned U.S. patent application filed on 6 Nov. 2007, and now identified by application Ser. No. 11/935,840.

For block-based decision feedback equalization, feedback filtering removes interference from previously detected symbols 50 corresponding to one or more preceding symbol blocks 54, and yields $$\tilde{z} = z - (1-\alpha) H_1 A_1 \hat{s}_1. \qquad \text{Eq. (2)}$$

The term α is between 0 and 1 and allows for no subtraction (1), full subtraction (0) and partial subtraction. No subtraction amounts to no feedback and thus represents block-based linear equalization using only feedforward filtering. The value can be set to a specific value during initial design or adaptively set depending on the estimated reliability of the symbol estimates. Separate values for different bits, different symbols, or different symbol blocks can be used.

This modified signal can be modeled as $$\tilde{z} = H_2 A_2 s_2 + u, \qquad \text{Eq. (3)}$$

where the first term is treated as the signal term and the second term u is a mixture of non-detected or partially subtracted symbol interference and noise (other interference and thermal noise). Specifically, $$u = \alpha H_1 A_1 s_1 + H_3 A_3 s_3 + n. \qquad \text{Eq. (4)}$$

With the joint detector 82, a joint metric is formed for the likelihood that $s_2$ equals a possible symbol vector $S_m$, formed as a particular combination of possible symbol values. One such metric is $$M_1(s_2 = S_m) = -(\tilde{z} - H_2 A_2 S_m)^H R^{-1} (\tilde{z} - H_2 A_2 S_m), \qquad \text{Eq. (5)}$$

where superscript "H" denotes conjugate transpose. An equivalent simpler metric is given by $$M_2(s_2 = S_m) = 2Re\{S_m^H y\} - S_m^H Q S_m, \qquad \text{Eq. (6)}$$

where $$y = W^H \tilde{z}, \qquad \text{Eq. (7)}$$

$$W = R^{-1} H_2 A_2, \qquad \text{Eq. (8)}$$

and $$Q = A_2 H_2^H R^{-1} H_2 A_2 = W^H H_2 A_2. \qquad \text{Eq. (9)}$$

The vector y has only one entry per symbol in the block. It is formed by applying combining weights (the columns of W) to the interference removed data. The matrix Q can be interpreted as an SINR matrix, as the diagonal elements are SINR values for the different symbols within the block.

The matrix R is the impairment correlation or covariance matrix associated with u. It can be computed parametrically by the detection circuit 40 or by another processing element within the receiver 32 using $$R = \alpha^2 H_1 A_1^2 H_1^H + H_3 A_3^2 H_3^H + N_0 R_n \qquad \text{Eq. (10)}$$

where the elements in $R_n$ depend on which values, e.g., Rake-combined values, are used to form z. For example, if z corresponds to the $K_1$ codes for transmitter 0 and symbol period 0 that form a given symbol block 54 of interest, then $R_n$ is $K_1 \times K_1$ and $$R_n = H_2. \qquad \text{Eq. (11)}$$

Advantageously, then, applying feedforward filtering in block-based decision feedback equalization embodiments of the detection circuit 40 may comprise accounting for partially removed inter-block interference arising from a preceding symbol block 54 in filtering coefficients used for feedforward filtering. In such embodiments, applying subtractive cancellation (through feedback filtering) comprises either full or fractionally weighting cancellation values for subtractive cancellation, not necessarily as a function of the extent to which the filtering coefficients used for feedforward filtering account for the inter-block interference arising from the preceding symbol block 54.

In contrast to specifically accounting for the spreading codes used to encode symbols 50 in the symbol blocks 54 of interest, code averaging techniques can be adopted in the detection circuit 40, wherein the detection circuit processing is configured to average out the effects of the spreading codes. As these codes typically change with blocks, due to long code scrambling at the transmitter, code averaging greatly simplifies the feedforward filter designs for both the block-based equalization and the block-based decision feedback equalization embodiments of the block equalizer 80.

With code averaging, the impairment correlation matrix and possibly the channel response matrices do not depend on spreading codes, so they can be reused from block to block as long as the medium response has not changed significantly. The term "code averaging" does not imply performing averaging over codes by considering multiple codes in the receiver. Rather, it implies that the quantities computed correspond to values that would be obtained if code averaging were explicitly performed. As a general design and implementation proposition, feedback filtering in the block-based decision feedback equalization embodiments of the block equalizer 80 still needs to use spreading codes to accurately subtract preceding block interference. For example, the filter coefficients used in the feedback filter circuit 114 (FIGS. 8 and 10) or 130 (FIG. 9) would be computed using code-dependent correlation estimates that account for preceding block interference.

The code-averaged quantities can be obtained in a way similar to known methods for obtaining G-Rake combining weights. Bottomley, Ottosson, and Wang present exemplary methods in their paper, "A generalized RAKE receiver for interference suppression," IEEE J. Sel. Areas in Commun., vol. 18, pp. 1536-1545, August 2000. Wang and Bottomley present further methods and variations in the paper, "DS-CDMA downlink system capacity enhancement through interference suppression," IEEE Trans. Wireless Commun., vol. 5, no. 7, pp. 1767-1774, July 2006.

However, one difference to consider in the current context is that instead of working with despread values, code-averaging embodiments of the detection circuit 40 generally will operate with signal values 60 taken as chip samples or Rake/G-Rake-combined chip samples, despread values of one or more codes or sliding Rake-combined values of one or more codes. Traditional Rake-combined or G-Rake-combined values from different codes generally cannot be used to estimate a particular symbol when code averaging is employed.

As an example, consider the case in which chip samples are used as the signal values 60 for input to the detection circuit 40. Collecting signals from different antennas into a vector, the received signal r(t) can be modeled as $$r(t) = \sum_{i=0}^{M-1} \sum_{\ell=0}^{L-1} g^{(i)}(\ell) x^{(i)}(t - \tau^{(i)}(\ell)) + n(t), \quad \text{Eq. (12)}$$

where $g^{(i)}(l)$ is the medium channel response coefficients associated with the $i$th transmitter and path delay $\tau^{(i)}(l)$, L is the number of path delays, M is the number of transmitters modeled, $x^{(i)}(t)$ is the transmitted signal from the $i$th transmitter n(t) models thermal noise and other interference. In practice, the channel response coefficients and delays would be estimated.

The transmitted signal 20 includes, for example, K parallel codes, of which $K_1$ are used to form a symbol block 54 of interest and $K-K_1$ are considered part of the impairment (together with n(t)). The spreading waveforms consist of spreading codes convolved with a chip pulse shape p(t) with auto-correlation $R_p(\tau)$.

At the receiver 32, a transversal filter is applied to either the original chip samples (in block-based linear equalization embodiments) or modified chip samples in which past block contributions have been removed (block-based decision feedback equalization embodiments). These chip samples have already been pre-filtered by a receive filter matched to the transmit filter. The filtered chip samples are then provided to a bank of despreaders for each of the $K_1$ codes of interest. This produces a vector of detection statistics $\breve{y}$.

Like the code-specific case, symbols 50 within a symbol block 54 of interest are detected jointly using the metric $$M_3(s_2=S_m)=2Re\{S_m^H \breve{y}\}-S_m^H \breve{Q} S_m, \quad \text{Eq. (13)}$$

where the u-shaped mark is used to indicate that code-averaged quantities are used. Assume the desired symbols are the symbols 50 carried by the spreading codes 0, 1, $K_1-1$ (k=0, 1, . . . , $K_1-1$) during the $0^{th}$ symbol period (j=0) transmitted by transmitter 0 (i=0). Regarding the corresponding filter design, feedforward filtering takes a stream of antenna signals (possibly modified by feedback filtering) as inputs v(m) and outputs a scalar chip signal e(m). Specifically, $$e(m)=w^H(m)v(m), \quad \text{Eq. (14)}$$

where w(m) is a vector of filter or combining weights and $$v(m) = \begin{bmatrix} x(mT_S - d_1) \\ \vdots \\ x(mT_S - d_J) \end{bmatrix}, \quad \text{Eq. (15)}$$

where $T_s$ is the sample period, x(t) is the received signal after the receive filter and possible subtraction of past blocks, and the ds are the relative tap delays of the filter. The weights are obtained by solving $$R(m)w(m)=f, \quad \text{Eq. (16)}$$

where R(m) and f are made of sub-blocks given by $$R(d_1, d_2, m_0) = E_c^{(0)}(1) \quad \text{Eq. (17)}$$

$$\sum_{\ell_1=0}^{L-1} \sum_{\ell_2=0}^{L-1} g^{(0)}(\ell_1)(g^{(0)}(\ell_1))^H \times \sum_{m=-\infty}^{\infty} \alpha(m) R_p(d_1 - \tau^{(0)}(\ell_1) +$$

$$(m_0 - m)T_c) R_p^*(d_2 - \tau^{(0)}(\ell_2) + (m_0 - m)T_c) +$$

$$E_c^{(0)}(2) \sum_{\ell_1=0}^{L-1} \sum_{\ell_2=0}^{L-1} g^{(0)}(\ell_1)(g^{(0)}(\ell_2))^H \sum_{m=-\infty}^{\infty} R_p(d_1 - \tau^{(0)}(\ell_1) +$$

$$(m_0 - m)T_c) R_p^*(d_2 - \tau^{(0)}(\ell_2) + (m_0 - m)T_c) +$$

$$\sum_{i=1}^{M-1} E_c^{(i)} \sum_{\ell_1=0}^{L-1} \sum_{\ell_2=0}^{L-1} g^{(i)}(\ell_1)(g^{(i)}(\ell_2))^H$$

$$\sum_{m=-\infty}^{\infty} R_p(d_1 - \tau^{(i)}(\ell_1) + (m_0 - m)T_c)$$

$$R_p^*(d_2 - \tau^{(i)}(\ell_2) + (m_0 - m)T_c) + N_0 R_p(d_1 - d_2)$$

and $$f(d_1) = \sum_{\ell=0}^{L-1} g^{(0)}(\ell) R_p(d_1 - \tau^{(0)}(\ell)). \quad \text{Eq. (18)}$$

Here, $E_c^{(i)}$ is the power from transmitter i (total energy per chip), $E_c^{(0)}(1)$ is the power from the desired transmitter (0) allocated to the desired signal, $E_c^{(0)}(2)$ is the power from the desired transmitter (0) allocated to other codes, and $N_0$ is the noise power. Note that these power levels can be estimated using a parametric G-Rake approach or using code power estimation and summing up power on different codes. The co-pending and commonly assigned patent application, as filed on 12 Mar. 2004 and assigned application Ser. No. 10/800,167, provides details for such estimation in the context of parametric G-Rake processing.

In practice, R and f can be estimated parametrically using the above equations. Note that while the weights are time-varying, they are periodic in N. Thus, the weights computed for the chip periods in one symbol period can be reused in subsequent symbol periods if the channel coefficients have not changed substantially. Also, the term $\alpha(m)$ depends on the implementation of the receiver 32, and particularly depends upon whether the detection circuit 40 is configured to carry out block-based linear equalization in advance of the joint detector 82, or to carry out block-based decision feedback equalization. For both cases, the term is $\beta$ for m=0 through N-1 and 1 for m greater than N-1, where $\beta$ is a design parameter. For block-based decision feedback equalization embodiments, it is $\alpha^2$ for m less than 0; for the block-based linear equalization embodiments, it is 1 for m less than 0.

In general, with code averaging, the FFF should use a generous grid of processing delays centered on the first path delay. For most cases, setting $\beta$ to 0 works well. However, as the design does not account for minimum distance between symbols within a block, for some channel realizations and spreading codes it helps to use a value between 0 and 1, particularly for block-based linear equalization. This allows for partial suppression of intra-block interference.

An adaptive selection of FFF designs can be used, in which a quality metric can be determined for different $\beta$ values, and the value which maximizes the quality metric can be selected. With joint detection, performance is related to the Q matrix in Eq. (13). Specifically, minimum distance between joint symbols is related to the smallest eigenvalue of Q. Thus, one quality metric for selecting $\beta$ is the minimum eigenvalue for the resulting Q matrix. The goal would be to maximize the minimum eigenvalue. One approach would be to try a predetermined set of fixed values for $\beta$ and select the one that maximizes the quality metric. Another approach would be to iteratively determine $\beta$ to maximize the metric. For complex modulation, such as QPSK and 16-QAM, there is rotational symmetry. As a result, the elements in Q should be replaced by their magnitudes before determining the smallest eigenvalue. To avoid undesirably rapid adaptation, code averaged Q may be used. Standard approaches for estimating eigenvalues can be used. Note that the same adaptive selection approach can be used for the code-specific Q matrix in Eq. (6). In Eq. (10), an additional term $\beta H_2 A_2^2 H_2^H$ can be introduced to account for partial suppression of intra-block interference.

In any case, in at least one embodiment, the detection statistics 62 are produced by despreading the filtered signal output by the block equalizer 80. For example, the filtered signal is despread by a bank of despreaders using the codes of the desired symbols. The despreaders may be implemented as part of the block equalizer 80. Mathematically, for code k, $$\breve{y}_k = \sum_{m=0}^{N-1} e(m)(c_{k,0}^{(0)}(m))^*, \quad \text{Eq. (19)}$$

where N is the spreading factor. These despread values are then used in the joint detection metric above. The metric requires elements of the $\breve{Q}$ matrix. These are given by $$Q(k_1, k_2) = \sqrt{E_S/N} \sum_{\ell=0}^{L-1} \sum_{j=0}^{N-1} w^H(j) g^{(0)}(\ell) \quad \text{Eq. (20)}$$

$$(c_{k_1,0}^0(j))^* \sum_{m=0}^{N-1} R_p((j-m)T_c - \tau^{(0)}(\ell)) c_{k_2,0}^0(m),$$

where $E_s$ is the energy per desired symbol, and $T_c$ is the chip period. Note that the energy-per-symbol or power of the traffic data or related quantity (ratio of pilot and data powers) is needed. This can be estimated using standard approaches to estimating code powers in a CDMA system.

While a time-varying transversal chip equalizer has been described in the above examples, other forms are possible. One form is a time-invariant transversal chip equalizer. In this case, the R matrix is given by the average of the R(m) matrices. Another form is a matrix chip equalizer can also be used. In this case, feedforward filtering in the block equalizer 80 applies a matrix multiply to a collection of signal values to produce a vector of equalized chip values. Specifically, the vector of inputs to feedforward filtering (denoted x, even though feedback filtering may have been used to modify the original x values) can be modeled as $$x = H_1 H_2 s + n, \quad \text{Eq. (21)}$$

where n is interference from other symbol blocks 54, other transmitters and noise. It has covariance R. The matrix $H_2$ models the spreading by chip sequences and $H_1$ models the effects of chip pulse shaping (transmit filter), radio channel, and receive filtering. In this case $$\breve{y} = W^H x, \quad \text{Eq. (22)}$$

and $$Q = H_2^H H_1^H R^{-1} H_1 H_2 = H_2^H F^H H_1 H_2, \quad \text{Eq. (23)}$$

where W is the equalization matrix, which is determined as $$W = R^{-1} H_1 H_2 = F H_2. \quad \text{Eq. (24)}$$

Here F can be determined for a symbol block 54 using a code-averaged value for R. Thus, it can be shared over multiple block periods. The structure discussed below can be used, in which feedforward filtering implements a matrix multiply by $F^H$. A bank of correlators then implements multiplication by $H_2^H$.

Figure 13:
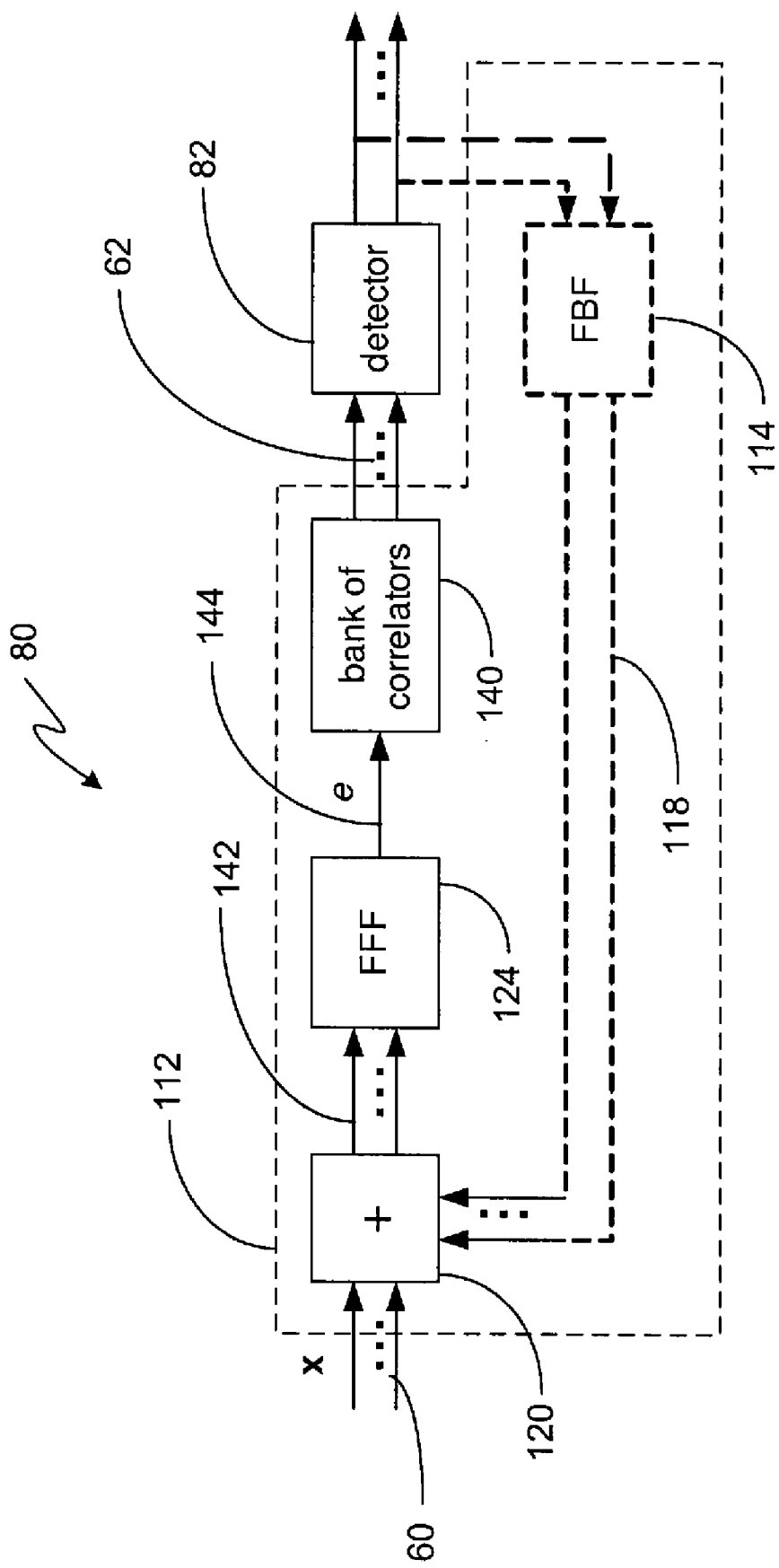
FIG. 13 is a block diagram of another embodiment of a receiver circuit for block-based received signal processing, including (spreading) code specific processing aspects.

FIG. 13 illustrates such an embodiment, using a bank of correlators 140. In the illustration, one sees that the block equalizer 80 is implemented as a block-based decision feedback equalizer 112. More particularly, one sees that the signal values 60 obtained from the received signal 36 are processed in the combining circuit 120, to produce modified signal values 142. This processing suppresses the effects of preceding symbol block interference, based on the feedback filter 114 providing filtered, previously detected symbol values 118. These modified signal values 142 are then input to the feedforward filter circuit 124, which produces corresponding filtered signals 144. The bank of correlators 140 operates on the filtered signals obtained via feedforward filtering, and provides the corresponding detection statistics 62 to the joint detector 82, for joint symbol detection. Note that in FIG. 13, if the elements shown in dotted lines are omitted (except for 112), one would have a block-based linear equalization implementation. In that case, the block equalizer 80 can be implemented as the block-based linear equalization circuit 100, as shown in FIG. 7. Thus, it should be understood that the processing described immediately above can be implemented in block linear equalization and in block decision feedback equalization embodiments.

For block decision feedback equalization embodiments, there is an issue of how to get started, as there may not be previously detected symbols from a previous time slot or Transmission Time Interval (TTI). There are several possible approaches to initialization. For example, the detection circuit 40 may be configured to use another demodulator or equalizer, such as Rake, G-Rake or linear multi-user detection to detect symbols in the first several blocks, then start block-based decision feedback equalization. These supplemental or starting demodulation circuits can be implemented via hardware, software, or both, either within the detection circuit 40, or elsewhere in the receiver 32.

Alternatively, a gradual transition can also be used for startup. For example, initial processing begins with block-based decision feedback equalization, but the block equalizer 80 is configured to start with 0 values in the feedback filtering, or is configured not to perform subtractive cancellation initially. As decisions are made, the feedback filter 114 will have nonzero values to work with. Ideally, feedback filtering should be redesigned/adapted each time, accounting for how many previously detected symbols 50 have been subtracted. The previous symbol blocks 54 not subtracted can be included in the third group of symbols (undetected symbols) or as part of the impairment correlation matrix R.

If self-interference is the main concern, then the block equalizer 80 can work directly with chip samples or Rake (matched filter) outputs. If there are other sources of interference, one way to handle these is to account for them in R for the feedforward filter, as described previously, or in R for a G-Rake front-end receiver. Another method contemplated herein is to use a form of G-Rake, denoted G-Rake+−, to suppress other sources of interference while not suppressing self-interference, which is handled by the block equalizer 80 as already detailed herein. For example, the G-Rake+− approach can be implemented as described in U.S. Pat. No. 6,975,672 to Bottomley et al., issued on 13 Dec. 2005 and owned in common with the instant application.

Figure 14:
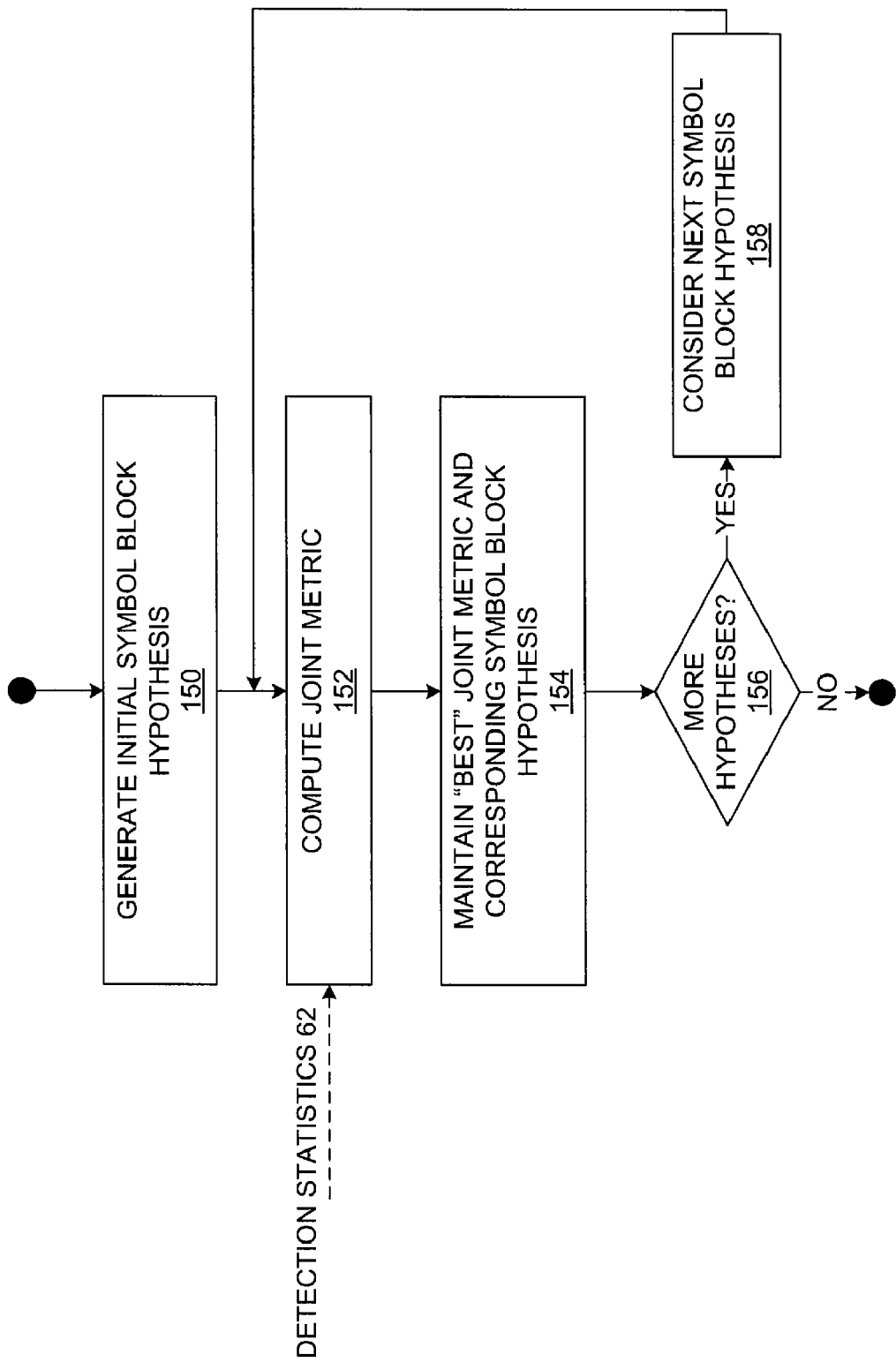
FIG. 14 is a logic flow diagram of one embodiment of processing logic for joint detection of individual symbols within a given symbol block of interest.

Turning from the block equalization aspects to joint detection aspects, it should be understood that whether block-based linear equalization (e.g., FIG. 7) or block-based decision feedback equalization (e.g., FIG. 8 or 9) is used, the block equalizer 80 suppresses inter-block interference in the signal values of each symbol block 54. Complementing that inter-block interference suppression, the joint detector 82 inherently addresses intra-block interference (ISI between the individual symbols 50 within each symbol block 54) by determining the most likely combination of symbols contained in each symbol block 54 that is of interest. In at least one embodiment, the joint detector 82 may comprise a digital signal processor or other microprocessor-based circuit, implements processing logic in accordance with the method operations shown in FIG. 14.

The joint detector 82 jointly detects the symbols 50 in any given symbol block 54 as a function of a number of symbol hypotheses 74 and the detection statistics 62 produced by the signal values 60 corresponding to the given symbol block 54. Within the illustrated context of FIG. 14, processing begins with the joint detector 82 generating an initial symbol block hypothesis (Block 150). For example, a symbol block hypothesis is initialized by considering possible values for the symbols 50 within the given symbol block 54. The hypothesis is then evaluated by computing a joint metric (Block 152), such as a log-likelihood metric used in maximum likelihood (ML) receivers.

Processing continues with maintaining the "best" joint metric and corresponding symbol block hypothesis (Block 154)—the initially calculated joint metric is maintained by default, at least until one or more additional joint metrics are computed for other ones in the number of symbol block hypotheses 74 to be considered. Thus, to the extent that there are more symbol block hypotheses 74 left to consider (Yes from Block 156), the next symbol block hypothesis is considered (Block 158), and the operations of Blocks 152 and 154 are repeated for this next-considered symbol block hypothesis. Each time a new joint metric is computed (Block 152) it may be evaluated, such as by comparison against the previously computed joint metrics, so that the best joint metric is maintained (Block 154). Alternatively, a set of joint metrics 64 can be computed, each corresponding to a different symbol block hypothesis in a set of symbol block hypotheses 74, and then individual ones of them compared to identify the "best" one.

"Best" in this sense depends on the metric being evaluated. In at least one embodiment, the "best" joint metric is the smallest valued joint metric in the set of joint metrics 64 computed from the detection statistics 62 for a given symbol block 54, where the most likely symbol block hypothesis minimizes the joint metric value. In another embodiment, the "best" joint metric is the largest valued joint metric in the set of joint metrics 64 computed from the detection statistics 62 for a given symbol block 54, where the most likely symbol block hypothesis maximizes the joint metric value. Regardless, it should be understood that the processing of FIG. 14 identifies the best joint metric from some number of joint metrics 64, where that best joint metric corresponds to the symbol block hypothesis most likely to represent the transmitted symbols within the given symbol block 54 being evaluated. As such, the detected symbol values 70 output from the joint detector 82 for each symbol block 54 represent jointly detected hard or soft values for each symbol 50 in a given symbol block 54 of interest.

Complexity can be greatly reduced by using an approach where a group of one or more symbols are hypothesized while other symbols in a block are simply detected.

In more detail, such an approach provides advantageous joint detection teachings where two or more multi-valued digital data symbols are spread with different spread spectrum codes and combined for transmission. A conventional receiver receives the combined signal and correlates with respective codes to attempt to recover the symbols. However, due either to the codes being non-orthogonal, or due to multipath distortion of orthogonal codes, the correlation does not completely separate the symbols with the result that each correlation value comprises a different mix of the symbols.

Accordingly, a joint symbol detector can be configured to determine the symbols which, when mixed in the same way, reproduce the correlations most closely. In one or more embodiments, such determining comprises hypothesizing all but one of the symbols and subtracting the effect of the hypothesized symbols from the mixed correlations. The remainders are then combined and quantized to the nearest value of the remaining symbol. Thus for each hypothesis of all but one of the symbols, the remaining symbol is determined. A metric is then computed for each symbol hypothesis including the so-determined remaining symbol and the symbol set that produces the best metric is chosen as the decoded symbols.

Applying these teachings to the receiver 32 disclosed herein, one embodiment of the receiver 32 is configured to implement a method for decoding a group (block 54) of symbols 50 from a set of received signal samples that depend on each symbol of the group to an extent depending on an associated dependence coefficient, which may calculated as a function of channel effects, spreading codes, etc. In particular, the block equalizer 80 of the detection circuit 40 can be used in computing first modified signal samples, e.g., detection statistics 62 representing a set of received signal values from which inter-block interference has been suppressed. Further, the block equalizer 80, joint detector 82, or other functional entity within the processing circuits 38, can be configured to calculate modified dependence coefficients using said dependence coefficients and said received signal samples.

With these determinations in place, the joint detector 82 performs joint detection of the symbols 50 in the block 54 as represented by the sample set. Particularly, for each possible combination of all except at least one symbol 50 in the block 54 of symbols 50, the joint detector 82 subtracts from the first modified signal samples the dependence on the combination of symbols 50 as described by the modified dependence coefficients in order to obtain second modified signal samples dependent principally on the remaining at least one symbol 50. Further, it determines unquantized values for the remaining at least one symbol 50 from the second modified signal samples, and quantizes each of the unquantized remaining at least one symbol 50 to the nearest symbol value in the symbol alphabet (e.g., modulation constellation) to obtain quantized values for said at least one remaining symbol 50. Alternatively, processing obtains quantized values from the second modified samples, without determining unquantized values.

Still further, the joint detector 82 associates the quantized symbol values with the combination of other symbols to obtain a candidate symbol group, i.e., a hypothesized combination of possible symbol values for the symbol block 54. For each such candidate symbol group, the joint detector 82 computes a metric that describes how well the candidate symbol group explains said set of received signal samples, and it selects the candidate group giving the best metric. The particular symbols in the best candidate group that correspond to the at least one symbol 50 that was excluded from the hypotheses are thus detected. Other symbols 50 in the block 54 can be similarly detected by excluding them from the hypothesized group of symbols 50 and repeating the process.

Viewed another way, a block 54 of symbols 50 can be decoded from a corresponding set of detection statistics 62, where those statistics comprise signal samples that depend on each symbol 50 of the block 54 to an extent depending on an associated dependence coefficient. Such a method comprises, for each selected subset of symbols 50 to be decoded from the block 54, forming hypothesized subsets representing different combinations of possible symbol values for those remaining symbols in the block 54 not included in the selected subset. Continuing, for each hypothesized subset, generating an estimate of the symbols 50 in the selected subset, and forming candidate symbol sets from the hypothesized subsets and the corresponding estimates. Each candidate symbol set thus representing a different combination of possible symbol values for the group of symbols. Processing continues with computing a metric for each candidate symbol set, the value of which indicates how well the candidate symbol set corresponds to the received signal samples, and outputting as decoded symbols the estimate of the symbols in the selected subset that corresponds to the candidate symbol set having a best one of the metrics.

In another approach, the detection statistics 62 generated for a given symbol block 54 can be evaluated in some "distance" sense, with respect to some or all of the symbol values, or combinations of such values, within a defined set of possible symbol values. That evaluation can then be used to identify a potentially much smaller subset of symbol block hypotheses 74 to evaluate for the best match. Further, soft information for FEC decoding can be obtained in the usual ways. For example, for each bit, all the likelihoods can be used to form a soft value using a ratio of exponentials. Dual-max and its variations can also be used.

In another aspect of processing contemplated herein, multi-pass processing is used, where block equalization and joint detection are run two or more times. In one method embodiment, processing comprises generating detection statistics 62 and jointly detecting symbol values in a forward direction to obtain first soft symbol values for the symbols 50 in a given symbol block 54 of interest, and in a reverse direction to obtain second soft symbol values for them. Final symbol values are obtained by linearly combining respective ones of the first and second soft symbol values. In this context, forward and reverse directions connote the processing order of signal values relative to the time-wise order of the signal values.

In another embodiment, the detection circuit 40 is configured to run block equalization and joint detection in forward and reverse directions by generating detection statistics 62 and jointly detecting symbol values in a forward direction to obtain first symbol values for the symbols 50 in given symbol block 54 of interest, and in a reverse direction to obtain second symbol values for the symbols 50 in the symbol block 54. Processing continues with detecting the symbols 50 in the symbol block 54 by choosing, for each symbol 50 to be detected, either the corresponding first symbol value or the corresponding second symbol value according to an arbitration process. The arbitration process, which may be implemented in hardware, software, or any combination thereof, within the joint detector 82, may arbitrate in instances where the forward and reverse detection results disagree by, for example, selecting the highest-confidence one of the forward or reverse-detected soft symbol values.

In one or more other embodiments, the arbitration processing employs maximum-likelihood metric over a window of received values about the block of interest. Arbitration-based processing as implemented herein may incorporate teachings from the co-owned U.S. patent application assigned application Ser. No. 12/035,932 and entitled "A Method and Apparatus for Symbol Detection Via Reduced Complexity Sequence Estimation Processing," which is filed concurrently herewith, incorporated herein by reference. In particular, arbitration processing may employ a (maximum likelihood) sequence estimation process. Advantageously, the state spaces forming vertices in a sequence estimation lattice are formed using subsets of possible symbol values or possible combinations of symbol values for each symbol 50 in a symbol block 54 of interest, as determined by forward and backward equalization. In this manner, sequence estimation is used to estimate the most likely combination of symbols 50 making up the symbol block 54 of interest. Yet another embodiment generates detection statistics 62 and jointly detects symbol values in forward and reverse directions, to suppress inter-block interference in each symbol block of interest. Symbols are then re-detected.

In a more detailed treatment of the above-described two-pass processing within linear combining, the input values for joint symbol detection are obtained by linearly combining values from, for example, forward and reverse passes. For example, one may refer to FIG. 15, which depicts an embodiment of the block equalizer 80 that includes two block-based decision feedback equalizers, denoted as 112-1 and 112-2. A time-reverse circuit 160, which may be logically implemented via memory read-out control of buffered signal samples, provides the block-based decision feedback equalizer 112-2 with time-reversed signal values 60 for processing, while the block-based decision feedback equalizer 112 operates on normally ordered (forward direction) signal values 60.

Correspondingly, the joint detector 82 includes a joint detector 162-1 to process detection statistics 62-1 produced for the forward direction and a joint detector 162-2 to process the detection statistics 62-2 produced for the reverse direction. (These joint detectors 162-1 and 162-2 may be implemented like the single joint detector embodiment in FIG. 8, for example.) The joint detector 82 further includes a linear combiner 164, which linearly combines corresponding ones of the detection statistics 62-1 and 62-2, to produce improved detection statistics 62-3 for joint detection by a final detector 166. This final detector 166 may be configured to operate like the single joint detector embodiment illustrated in FIG. 8, for example, except that its input detection statistics 62-3 represent linear combinations of the forward and reverse-generated detection statistics 62-1 and 62-2. In particular, the detection statistics 62-1 and 62-2 in one or more embodiments comprise soft symbol outputs. In an alternative embodiment, the final detector 166 is configured to operate as a per-symbol detector, rather than as a joint detector. However, it should be understood that the joint detectors 162-1 and 162-2 operate as joint detectors.

Rather than assume for processing simplicity that noise components in the detection statistics 62-1 and 62-1 are uncorrelated, the detection circuit 40 may be configured to determine the correlation as follows. Consider the code-specific case first. In this instance, the detection circuit 40 may collect the detection statistics 62-1 from the forward pass and 62-2 from the backward pass into one longer vector y, which can be modeled as $$\tilde{y} = \begin{bmatrix} y_f \\ y_b \end{bmatrix} = \tilde{H}_2 A_2 s_2 + \tilde{u}, \qquad (25)$$

where $$\tilde{H}_2 = \begin{bmatrix} W_f^H H_2 \\ W_b^H H_2 \end{bmatrix}, \qquad (26)$$

and the impairment has covariance $$\tilde{R} = \begin{bmatrix} W_f^H H_3 A_3^2 H_3^H W_f + W_f^H R_n W_f & W_f^H R_n W_b \\ W_b^H R_n W_f & W_b^H H_1 A_1^2 H_1^H W_b + W_b^H R_n W_b \end{bmatrix}. \qquad (27)$$

Note that here sets 1 and 3 also include interference from symbol streams not to be detected (not eventually included in set 2). Similar to before, linear combining can be used to form $$\bar{y} = \tilde{W}^H \tilde{y}, \qquad (28)$$

$$\tilde{W} = \tilde{R}^{-1} \tilde{H}_2 A_2, \qquad (29)$$

and use the metric $$M_{lc}(s_2 = S_m) = 2Re\{S_m^H \bar{y}\} - S_m^H \bar{Q} S_m, \qquad \text{Eq. (30)}$$

where $$\bar{Q} = A_2 \tilde{H}_2^H \tilde{R}^{-1} \tilde{H}_2 A_2 = \tilde{W}^H \tilde{H}_2 A_2. \qquad \text{Eq. (31)}$$

Figure 15:
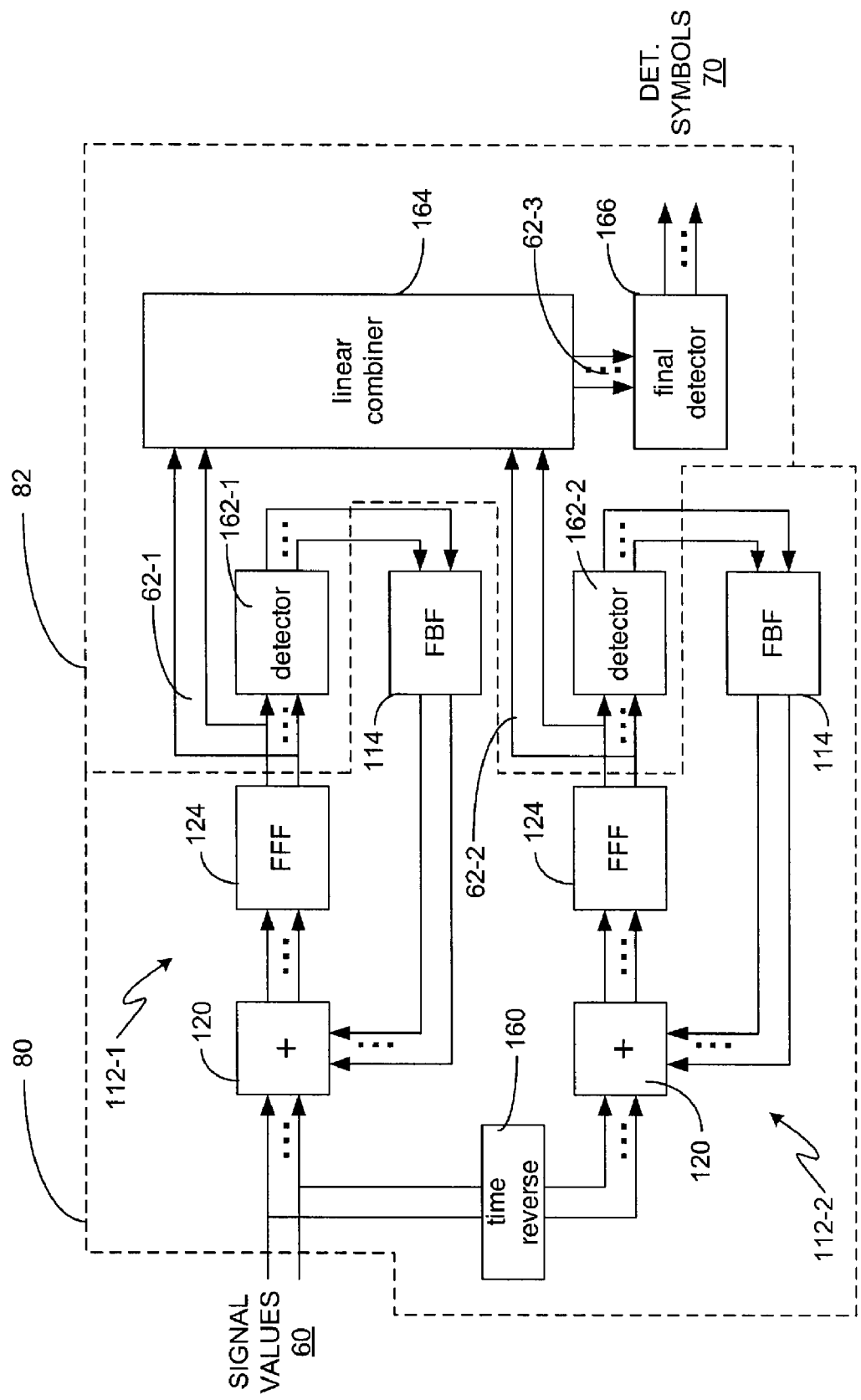
FIG. 15 is a block diagram of another embodiment of a receiver circuit for block-based received signal processing, including multi-pass processing with linear combining.
Figure 16:
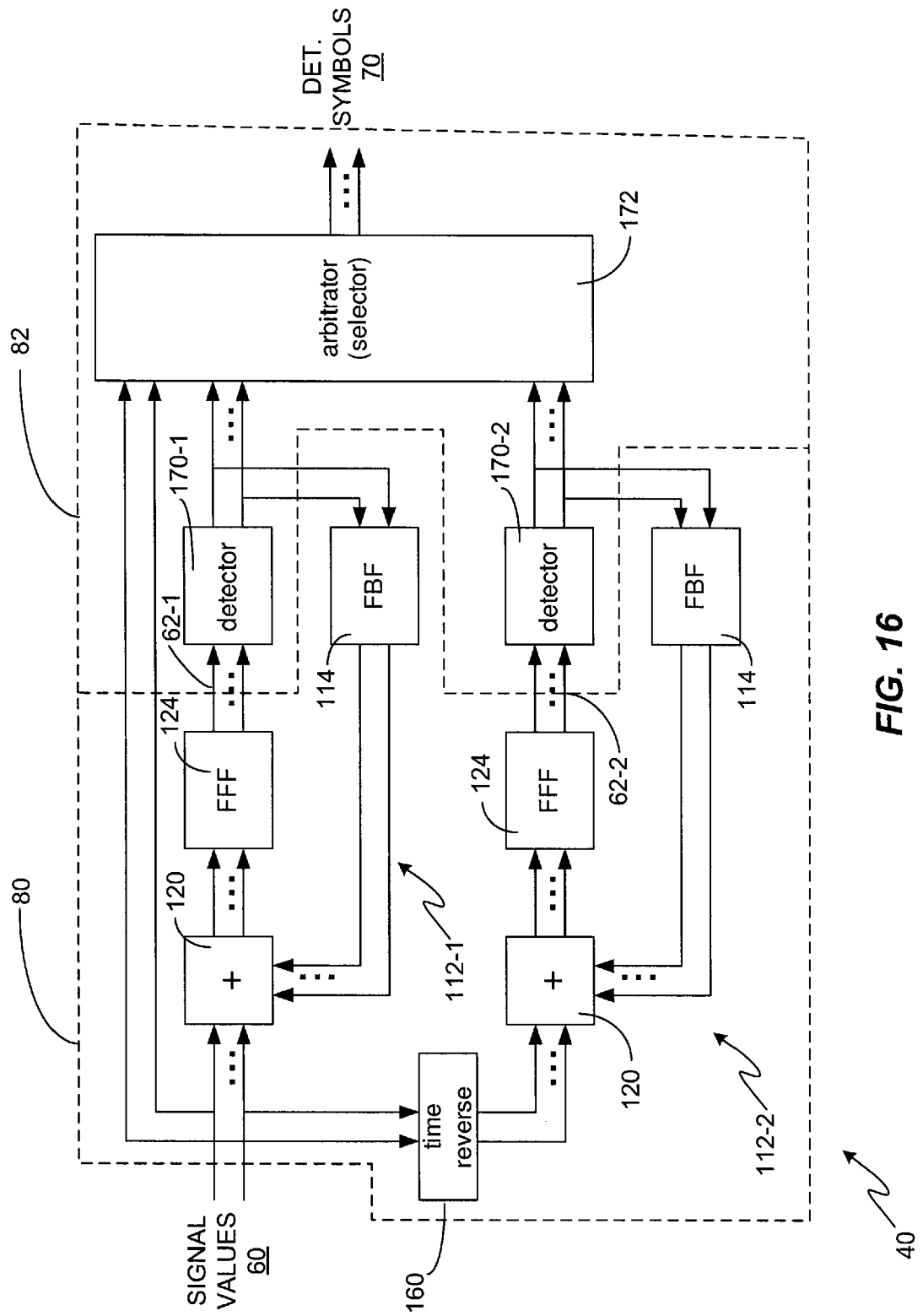
FIG. 16 is a block diagram of another embodiment of a receiver circuit for block-based received signal processing, including multi-pass processing with arbitration.

Turning from linear combining to a more detailed treatment of an embodiment of arbitration as introduced above, FIG. 16 illustrates an embodiment of the detection circuit 40, wherein the joint detector 82 comprises two joint detectors 170-1 and 170-2, respectively processing forward pass detection statistics 62-1 and reverse or backward pass detection statistics 62-2. This processing, and that of the block equalizer 80, corresponds to that just described for FIG. 15. However, unlike the linear combining embodiment of FIG. 15, FIG. 16 illustrates that the joint detector 82 includes an arbitrator 172 that produces final detected symbols 70 for each symbol block 54 of interest based on arbitration processing. The arbitrator 172 may be implemented in hardware, software, or any combination thereof.

Arbitration, at least in the illustrated embodiment, involves selecting detected symbol values from the two directions. With block-based processing, arbitration-based selection can be performed at the symbol block level. Notably, the Euclidean distance between the received signal and the predicted received signal over a window centered at a symbol of interest is used as a metric for selection. Another possible metric is a decoder metric, such as taught by Oh and Han in the paper, "Bidirectional equalizer arbitrated by Viterbi decoder path metrics," IEEE Trans. Consumer Electronics, vol. 53, no. 1, pp. 60-64, February 2007.

At least one embodiment of the detection circuit 40 is configured to generalize the Euclidean distance metric to account for noise color and any preprocessing. The detection circuit 40 also may be configured to provide a simpler metric that is equivalent in performance. As before, inputs can be collected from a window (possibly larger or smaller than the window used by feedforward filtering in the block equalizer 80) into a vector z. From there, the detection circuit 40 can compute and compare the following two metrics:

$$M_f(s_{2,f}) = -(z - z_f)^H R_n^{-1}(z - z_f), \qquad \text{Eq. (32)}$$

and $$M_b(s_{2,b}) = -(z - z_b)^H R_n^{-1}(z - z_b), \qquad \text{Eq. (33)}$$

where $$z_f = H_1 A_1 \hat{s}_{1,f} + H_2 A_2 \hat{s}_{2,f} + H_3 A_3 \hat{s}_{3,f} = HA\hat{s}_f, \qquad \text{Eq. (34)}$$

and $$z_b = H_1 A_1 \hat{s}_{1,b} + H_2 A_2 \hat{s}_{2,b} + H_3 A_3 \hat{s}_{3,b} = HA\hat{s}_b. \qquad \text{Eq. (35)}$$

Alternatively, the following metrics may be simpler to compute:

$$M_f(s_{2,f}) = 2Re\{s_f^H A H^H R_n^{-1} z_f\} - s_f^H A H^H R_n^{-1} HA s_f, \qquad \text{Eq. (36)}$$

and $$M_b(s_{2,b}) = 2Re\{s_b^H A H^H R_n^{-1} z_b\} - s_b^H A H^H R_n^{-1} HA s_b. \qquad \text{Eq. (37)}$$

Note that when the two directions give the same detected symbol values, processing can omit metric computation and, more simplistically, simply take the result from either direction. Also, note that the matrix $R_n$ may also include interference from symbol streams not detected (e.g. overhead channel symbol streams or streams from other transmitters).

Figure 17:
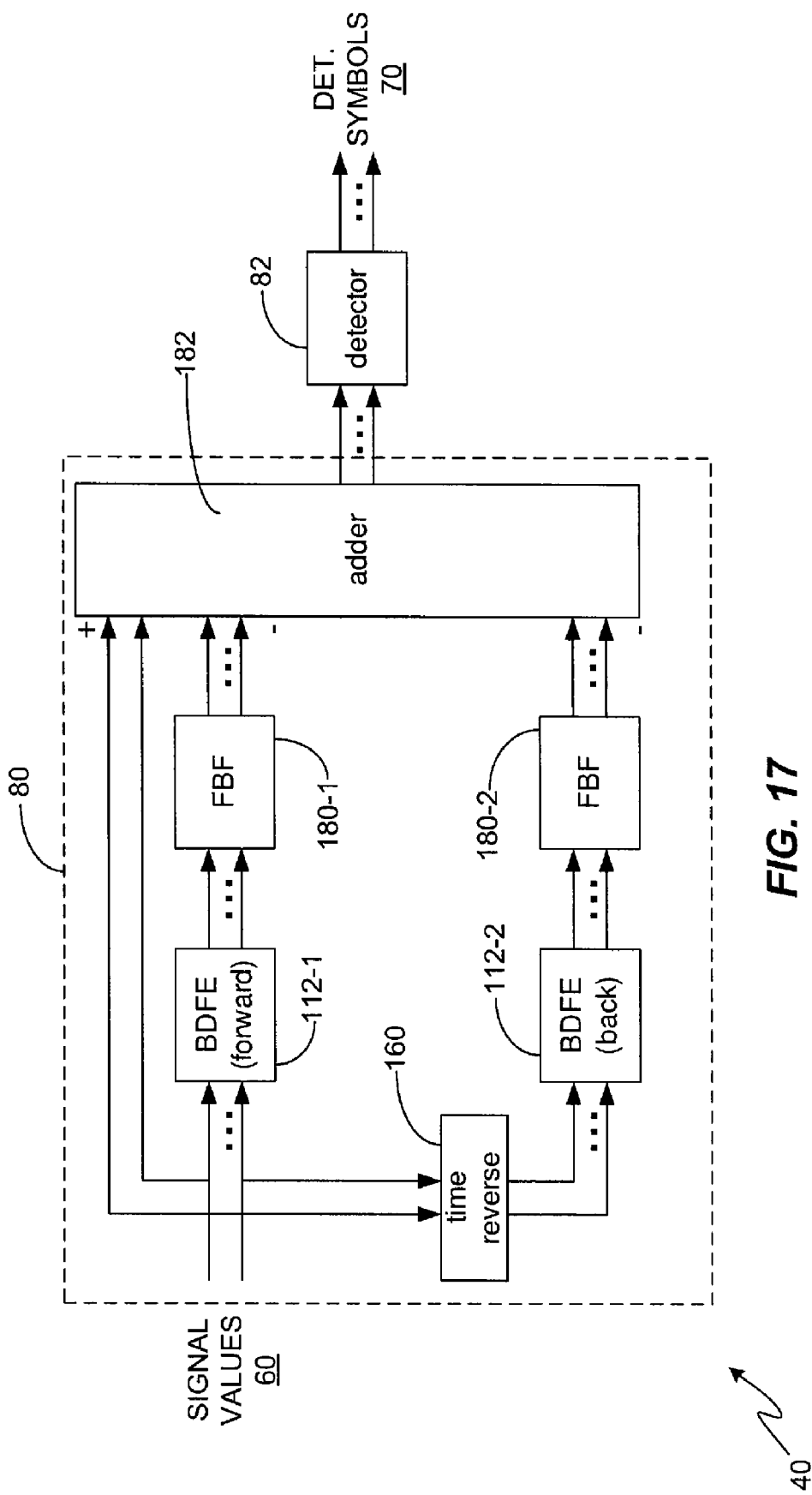
FIG. 17 is a block diagram of another embodiment of a receiver circuit for block-based received signal processing, including multi-pass processing with three-pass detection/re-detection processing.

Another embodiment of multi-pass processing involves three passes. Three-pass processing improves performance by subtracting both past and future inter-block interference. This operation is achieved by having two feedback filtering processes with no feedforward filtering process. FIG. 17 illustrates an embodiment of the detection circuit 40 as configured for three-pass processing.

As a non-limiting example of a three-pass processing configuration for the detection circuit 40, FIG. 17 illustrates that the block equalizer 80 includes first and second block-based decision feedback equalization circuits (BDFE) 112-1 and 112-2 for processing time-forward and time reverse signal values 60. Each circuit 112-1 and 112-2 may be implemented, for example, as shown in FIG. 8, and each such circuit is followed by a feedback filtering circuit 180-1 or 180-2. For a symbol block 54 to be detected, an adder 182 is used to subtract past inter-block interference using the forward BDFE filtered results. It also subtracts future inter-block interference using the backward BDFE filtered results. The metric for joint detection is similar to that described earlier herein, except here the set of "previously detected" symbols 50 includes those from past and future symbol blocks 54. Unlike arbitration, the three-pass processing approach requires each symbol block 54 of interest to be detected a total of three times.

With the above examples in mind, one sees that the teachings herein present methods and apparatus for symbol detection via block equalization for suppression of inter-block interference followed by joint symbol detection, which accounts for intra-block interference. Block equalization can be based on block-based linear equalization using feedforward filtering such as in FIG. 7, or on block-based decision feedback equalization using a combination of feedforward filtering and subtractive cancellation using feedback filtering, such as shown in FIGS. 8, 9, and 10. Moreover, in contrast to the one-pass processing depicted in any of those figures, multi-pass processing may be used, such as where time-wise forward processing results are used in combination with time-wise backward processing results, such as through linear combination (e.g., FIG. 15) or arbitration (e.g., FIG. 16).

Regardless of these variations, it should be broadly understood that the teachings presented herein provide advantageous recovery of a stream 52 of symbol blocks 54, each block containing two or more symbols 50. A broad method embodiment includes processing the received signal to form signal values 60 (chip samples, filtered chip samples, despread values, combined despread values), filtering the signal values 60, comprising at least feedforward filtering, to suppress inter-block interference from other symbol periods and produce a set of detection statistics 62 (for each symbol block 54 of interest), and jointly detecting the symbols 50 within a given symbol block 54 of interest by using the detection statistics 62 generated for that block to produce joint metrics 64, which may be compared to identify a best joint metric. Particularly, teachings presented herein provide for a method of recovering symbols from a received signal conveying a stream of symbol blocks, with each symbol block comprising two or more symbols. In at least one embodiment, such a recovery method comprises obtaining signal values from the received signal for each symbol block, generating detection statistics for the symbols in each symbol block by performing block-based equalization of the signal values, and jointly detecting the symbols in each symbol block by generating joint metrics from the detection statistics and comparing the joint metrics.

Also, as noted, block-based equalization may comprise performing block linear equalization on the signal values of each symbol block to suppress inter-block interference arising from succeeding and preceding symbol blocks, such as by generating the detection statistics as filtered signal values obtained by passing the signal values for each symbol block through a feedforward filter. These filter coefficients may be determined as a function of correlation estimates corresponding to inter-block interference in each symbol block arising from the preceding and succeeding symbol blocks. Alternatively, block-based equalization, including feedback filtering, may be implemented in combination with feedforward filtering. This variation includes performing block decision feedback equalization for the signal values in each symbol block to suppress interference arising from succeeding and preceding symbol blocks.

One embodiment of block-based decision feedback equalization comprises filtering previously detected symbol values as detected for one or more preceding symbol blocks. That filtering is performed in a feedback filter whose filter coefficients are determined as a function of spreading codes and channel estimates, to thereby obtain filtered prior values, which are then subtracted from the signal values 60 for a current symbol block to obtain modified signal values. Processing continues with filtering the modified signal values in a feedforward filter whose filter coefficients are determined as a function of succeeding block interference, to thereby obtain detection statistics for the current symbol block as filtered modified signal values. FIG. 8 illustrates an example of such processing. Alternatively, subtractive cancellation, i.e., the subtraction of feedback values to suppress inter-block interference arising from previously detected symbol blocks, may succeed feedforward filtering. FIG. 9 illustrates an example of this alternative arrangement, where the subtractive cancellation process operates on filtered signal values 138 (FIG. 9).

Also, as noted for block-based decision feedback implementations, feedforward filtering may be configured only to account for inter-block interference arising from succeeding symbol blocks, such that the subtractive cancellation process is relied upon for suppression of inter-block interference arising from preceding symbol blocks. Alternatively, the feedforward filtering coefficients may be generated to account for full or partial removal of preceding symbol block interference. In such embodiments, the subtractive cancellation process may use full or fractional weighting. In other words, with fractional weighting, subtractive cancellation is performed to partially remove the inter-block interference arising from the preceding symbol block(s). In such embodiments, feedforward filtering suppresses preceding symbol block interference, and subtractive cancellation through feedback filtering suppresses the inter-block interference arising from the one or more preceding symbol blocks.

More broadly with further regard to block equalization filtering, the teachings herein disclose the generation of filtering coefficients that depend on channel estimates and spreading codes and/or on channel estimates and code-specific impairment correlations. In alternative embodiments, block equalization filtering coefficients depend on channel estimates and code-averaged impairment correlations.

Also, as a broad consideration, joint detection performed after block equalization may comprise using the detection statistics for each symbol block to compute a joint metric for each symbol block hypothesis in a number of symbol block hypotheses representing different combinations of possible symbol values. Such processing includes comparing the resulting joint metrics to identify a most likely one of the symbol block hypotheses. Using the detection statistics in this context may comprise performing a maximum log-likelihood calculation based on the detection statistics for each symbol block hypothesis to produce a joint metric for each symbol block hypothesis.

Such processing also can be configured as multi-pass or iterative processing. In one example, first soft symbol values are obtained as detection statistics by performing block equalization and joint detection in a first pass that processes signal values in a time-wise forward direction. Like processing is performed in a second pass (either successively or concurrently with the first pass) but with the signal values processed in a time-wise reverse direction. Second soft symbol values obtained as the detection statistics from the second pass are combined with corresponding ones of the first soft symbol values in a linear combining process, and final symbol values for the symbol block of interest are detected from the linear combinations.

Other alternative multi-pass processing embodiments include generating detection statistics and jointly detecting said symbol values in a forward direction to obtain first symbol values for the symbols in the symbol block and in a reverse direction to obtain second symbol values for the symbols in the symbol block. Here, for each given symbol block being processed, detecting the symbols within the symbol block is performed by choosing, for each symbol in the symbol block, the corresponding first symbol value or the corresponding second symbol value according to an arbitration process. Yet another multi-pass embodiment comprises generating detection statistics and jointly detecting symbol values in a forward direction and in a reverse direction, suppressing inter-block interference in each symbol block of interest using symbol values detected in the forward and reverse directions, and re-detecting symbol values in each such symbol block.

With the preceding examples and explanations in mind, those skilled in the art will recognize that the teachings presented herein combine the simplicity of linear or decision feedback equalization with the performance of MLSE. These teachings achieve this synergistic combination of processing methods by performing block-based equalization (either block LE or block DFE) to produce detection statistics for the symbols included in each symbol block of interest, in combination with performing maximum likelihood (ML) joint detection using the detection statistics, to separate out the symbols within each block.

This method yields potentially significant performance advantages while minimizing complexity and offering significant implementation flexibility. As such, it should be understood that the foregoing description and the accompanying drawings represent non-limiting examples of the methods, systems, and individual apparatuses taught herein. The present invention therefore is not limited by the foregoing description and accompanying drawings. Instead, the present invention is limited only by the following claims and their legal equivalents.

What is claimed is:

1. A method of recovering symbols from a received signal conveying a stream of symbol blocks, each symbol block comprising two or more symbols, the method comprising:
obtaining signal values from the received signal for each symbol block;
performing block-based equalization using one or more filters to suppress inter-block interference and performing joint detection on a per-block basis to address intra-block interference;
said block-based equalization comprising generating detection statistics for the symbols in each symbol block by performing block-based feedforward filtering of the signal values obtained for the symbol block;
said generating detection statistics comprising subtracting interference associated with one or more previously detected symbol blocks from the signal values of the symbol block; and
said joint detection comprising jointly detecting the symbols in each symbol block on a per-block basis by, for each symbol block, generating joint metrics from the detection statistics generated for the symbol block and comparing the joint metrics to identify the most likely combination of symbols contained with the symbol block.

2. The method of claim 1, wherein said jointly detecting the symbols in each symbol block on a per-block basis comprises, for each symbol block, using the detection statistics for the symbol block to compute joint metrics corresponding to hypotheses for a group of symbols representing different combinations of possible symbol values within the symbol block, and comparing the resulting joint metrics to identify a most likely symbol block value representing said most likely combination of symbols contained within the symbol block, and wherein said using the detection statistics comprises performing a log-likelihood calculation based on the detection statistics for each group hypothesis to produce a joint metric for each group hypothesis.

3. The method of claim 1, wherein said performing block-based feedforward filtering comprises performing block linear equalization on the signal values of the symbol block to suppress inter-block interference arising from succeeding and preceding symbol blocks.

4. The method of claim 1, wherein said generating detection statistics includes generating filter coefficients for block-based equalization as a function of channel estimates generated for the received signal and code-specific impairment correlations.

5. The method of claim 1, wherein said generating detection statistics includes generating filter coefficients for block-based equalization as a function of channel estimates generated for the received signal and code-averaged impairment correlations.

6. The method of claim 1, comprising generating a plurality of sets of filter coefficients for block-based equalization and selecting a set for block-based equalization based on a quality metric.

7. The method of claim 1, wherein the received signal comprises a Code Division Multiple Access (CDMA) signal, and wherein the symbol blocks comprise two or more symbols defined by one or more spreading codes.

8. The method of claim 1, further comprising generating the signal values as one of chip samples obtained by sampling the received signal, filtered chip samples using Rake or G-Rake weights, despread values obtained by despreading the received signal according to one or more spreading codes, Rake-combined values obtained by combining despread values from two or more Rake fingers in an associated Rake receiver circuit, and GRake-combined values obtained by combining despread values from two or more GRake fingers in an associated GRake receiver circuit.

9. A method of recovering symbols from a received signal conveying a stream of symbol blocks, each symbol block comprising two or more symbols, the method comprising:
- obtaining signal values from the received signal for each symbol block;
- performing block-based equalization using one or more filters to suppress inter-block interference and performing joint detection on a per-block basis to address intra-block interference;
- said block-based equalization comprising generating detection statistics for the symbols in each symbol block by performing block-based feedforward filtering of the signal values obtained for the symbol block;
- said performing block-based feedforward filtering comprising performing block decision feedback equalization for the signal values of each symbol block to suppress interference arising from succeeding and preceding symbol blocks;
- said performing block decision feedback equalization comprising applying feedforward filtering to the signal values of the symbol block to suppress inter-block interference arising from the succeeding symbol block and applying subtractive cancellation to the signal values to suppress inter-block interference arising from the preceding symbol block; and
- said joint detection comprising jointly detecting the symbols in each symbol block on a per-block basis by, for each symbol block, generating joint metrics from the detection statistics generated for the symbol block and comparing the joint metrics to identify the most likely combination of symbols contained with the symbol block.

10. The method of claim 9, wherein said applying feedforward filtering comprises accounting for partial removal of inter-block interference arising from the preceding symbol block in filtering coefficients used for said feedforward filtering, and wherein said applying subtractive cancellation comprises fully or fractionally weighting cancellation values for subtractive cancellation.

11. A method of recovering symbols from a received signal conveying a stream of symbol blocks, each symbol block comprising two or more symbols, the method comprising:
- obtaining signal values from the received signal for each symbol block;
- performing block-based equalization using one or more filters to suppress inter-block interference and performing joint detection on a per-block basis to address intra-block interference;
- said block-based equalization comprising generating detection statistics for the symbols in each symbol block by performing block-based feedforward filtering of the signal values obtained for the symbol block;
- said performing block-based feedforward filtering comprising filtering previously detected symbol values detected for a preceding symbol block in a feedback filter whose filter coefficients are determined as a function of spreading codes and channel estimates, to thereby obtain filtered prior values, subtracting the filtered prior values from the signal values for a current symbol block to obtain modified signal values, filtering the modified signal values in a feedforward filter whose filter coefficients are determined as a function of succeeding block interference, to thereby obtain detection statistics for the current symbol block as filtered modified signal values, and
- said joint detection comprising jointly detecting the symbols in each symbol block on a per-block basis by, for each symbol block, generating joint metrics from the detection statistics generated for the symbol block and comparing the joint metrics to identify the most likely combination of symbols contained with the symbol block.

12. A method of recovering symbols from a received signal conveying a stream of symbol blocks, each symbol block comprising two or more symbols, the method comprising:
- obtaining signal values from the received signal for each symbol block;
- performing block-based equalization using one or more filters to suppress inter-block interference and performing joint detection on a per-block basis to address intra-block interference;
- said block-based equalization comprising generating detection statistics for the symbols in each symbol block by performing block-based feedforward filtering of the signal values obtained for the symbol block;
- said joint detection comprising jointly detecting the symbols in each symbol block on a per-block basis by, for each symbol block, generating joint metrics from the detection statistics generated for the symbol block and comparing the joint metrics to identify the most likely combination of symbols contained with the symbol block; and
- for a given symbol block, performing said generating detection statistics and said jointly detecting symbol values in a forward direction to obtain first soft symbol values for the symbols in the given symbol block and in a reverse direction to obtain second soft symbol values for the symbols in the given symbol block, and detecting, as final symbol values for the symbol block, the symbols in the given symbol block by linearly combining respective ones of the first and second soft symbol values.

13. A method of recovering symbols from a received signal conveying a stream of symbol blocks, each symbol block comprising two or more symbols, the method comprising:
- obtaining signal values from the received signal for each symbol block;
- performing block-based equalization using one or more filters to suppress inter-block interference and performing joint detection on a per-block basis to address intra-block interference;
- said block-based equalization comprising generating detection statistics for the symbols in each symbol block by performing block-based feedforward filtering of the signal values obtained for the symbol block;
- said joint detection comprising jointly detecting the symbols in each symbol block on a per-block basis by, for each symbol block, generating joint metrics from the detection statistics generated for the symbol block and comparing the joint metrics to identify the most likely combination of symbols contained with the symbol block; and
- for a given symbol block, performing said generating detection statistics and said jointly detecting symbol values in a forward direction to obtain first symbol values for the symbols in the given symbol block and in a reverse direction to obtain second symbol values for the symbols in the given symbol block, and detecting, as final symbol values for the given symbol block, the symbols in the given symbol block by choosing, for a symbol to be detected, either the corresponding first symbol value or the corresponding second symbol value according to an arbitration process.

14. A method of recovering symbols from a received signal conveying a stream of symbol blocks, each symbol block comprising two or more symbols, the method comprising:
- obtaining signal values from the received signal for each symbol block;
- performing block-based equalization using one or more filters to suppress inter-block interference and performing joint detection on a per-block basis to address intra-block interference;
- said block-based equalization comprising generating detection statistics for the symbols in each symbol block by performing block-based feedforward filtering of the signal values obtained for the symbol block;
- said joint detection comprising jointly detecting the symbols in each symbol block on a per-block basis by, for each symbol block, generating joint metrics from the detection statistics generated for the symbol block and comparing the joint metrics to identify the most likely combination of symbols contained with the symbol block; and
- performing said generating detection statistics and said jointly detecting symbol values in a forward direction and in a reverse direction for a number of symbol blocks, and, for at least one of such symbol blocks, suppressing inter-block interference using symbol values detected in the forward and reverse directions, and re-detecting symbol values in the at least one such symbol block, as final symbol values for said at least one such symbol block.

15. A communication receiver circuit configured to recover symbols from a received signal conveying a stream of symbol blocks, each symbol block comprising two or more symbols, the communication receiver circuit comprising one or more processing circuits configured to:
- obtain signal values from the received signal for each symbol block; and
- perform block-based equalization using one or more filters to suppress inter-block interference and perform joint detection on a per-block basis to address intra-block interference;
- wherein for said block-based equalization said one or more processing circuits are configured to generate detection statistics for the symbols in each symbol block by performing block-based feedforward filtering of the signal values obtained for the symbol block;
- wherein for said joint-detection on a per-block basis said one or more processing circuits are configured to jointly detect the symbols in each symbol block by, for each symbol block, generating joint metrics from the detection statistics generated for the symbol block and comparing the joint metrics to identify the most likely combination of symbols contained with the symbol block; and
- wherein the communication receiver circuit comprises a block-based decision feedback equalizer circuit and a joint detection circuit, wherein the block-based decision feedback equalizer circuit comprises a feedback filter circuit that produces filtered detection statistics for a preceding symbol block, a cancellation circuit that cancels the filtered detection statistics from the signal values of a current symbol block, and a feedforward filter circuit that produces the detection statistics for a symbol block by passing the signal values for the symbol block through a feedforward filter whose filter coefficients account for inter-block interference arising from a succeeding symbol block.

16. A communication receiver circuit configured to recover symbols from a received signal conveying a stream of symbol blocks, each symbol block comprising two or more symbols, the communication receiver circuit comprising one or more processing circuits configured to:
- obtain signal values from the received signal for each symbol block; and
- perform block-based equalization using one or more filters to suppress inter-block interference and perform joint detection on a per-block basis to address intra-block interference;
- wherein for said block-based equalization said one or more processing circuits are configured to generate detection statistics for the symbols in each symbol block by performing block-based feedforward filtering of the signal values obtained for the symbol block;
- wherein for said joint-detection on a per-block basis said one or more processing circuits are configured to jointly detect the symbols in each symbol block by, for each symbol block, generating joint metrics from the detection statistics generated for the symbol block and comparing the joint metrics to identify the most likely combination of symbols contained with the symbol block; and
- wherein the communication receiver circuit is configured to, for each symbol block, generate the detection statistics and jointly detect the symbol values in a forward direction to obtain first soft symbol values for the symbols in the symbol block and generate the detection statistics and jointly detect the symbol values in a reverse direction to obtain second soft symbol values for the symbols in the symbol block, and detect, as final symbol values for the symbol block, the symbols in the symbol block by linearly combining respective ones of the first and second soft symbol values.

17. A communication receiver circuit configured to recover symbols from a received signal conveying a stream of symbol blocks, each symbol block comprising two or more symbols, the communication receiver circuit comprising one or more processing circuits configured to:
- obtain signal values from the received signal for each symbol block; and
- perform block-based equalization using one or more filters to suppress inter-block interference and perform joint detection on a per-block basis to address intra-block interference;
- wherein for said block-based equalization said one or more processing circuits are configured to generate detection statistics for the symbols in each symbol block by performing block-based feedforward filtering of the signal values obtained for the symbol block;
- wherein for said joint-detection on a per-block basis said one or more processing circuits are configured to jointly detect the symbols in each symbol block by, for each symbol block, generating joint metrics from the detection statistics generated for the symbol block and comparing the joint metrics to identify the most likely combination of symbols contained with the symbol block; and
- wherein the communication receiver circuit is configured to, for each symbol block, generate the detection statistics and jointly detect the symbol values in a forward direction to obtain first symbol values for the symbols in the symbol block and in a reverse direction to obtain second symbol values for the symbols in the symbol block, and detect, as final symbol values for the symbol block, the symbols in the symbol block by choosing, for each symbol to be detected, either the corresponding first symbol value or the corresponding second symbol value according to an arbitration process.

18. A communication receiver circuit configured to recover symbols from a received signal conveying a stream of symbol blocks, each symbol block comprising two or more symbols, the communication receiver circuit comprising one or more processing circuits configured to:

obtain signal values from the received signal for each symbol block; and perform block-based equalization using one or more filters to suppress inter-block interference and perform joint detection on a per-block basis to address intra-block interference;

wherein for said block-based equalization said one or more processing circuits are configured to generate detection statistics for the symbols in each symbol block by performing block-based feedforward filtering of the signal values obtained for the symbol block;

wherein for said joint-detection on a per-block basis said one or more processing circuits are configured to jointly detect the symbols in each symbol block by, for each symbol block, generating joint metrics from the detection statistics generated for the symbol block and comparing the joint metrics to identify the most likely combination of symbols contained with the symbol block; and wherein the communication receiver circuit is configured to generate the detection statistics and jointly detect the symbol values in a forward direction and in a reverse direction, suppress inter-block interference in the signal values of a symbol block using the symbol values detected in the forward and reverse directions, and re-detect symbol values in the symbol block as final symbol values for said symbol block.

* * * * *